United States Patent
Tsai et al.

(10) Patent No.: US 11,008,091 B2
(45) Date of Patent: May 18, 2021

(54) BODY MOUNTED SHRINKING LANDING GEAR

(71) Applicant: The Boeing Company, Chicago, IL (US)

(72) Inventors: Kevin Tsai, Seattle, WA (US); Seiya Sakurai, Fall City, WA (US)

(73) Assignee: The Boeing Company, Chicago, IL (US)

( * ) Notice: Subject to any disclaimer, the term of this patent is extended or adjusted under 35 U.S.C. 154(b) by 310 days.

(21) Appl. No.: 15/970,046

(22) Filed: May 3, 2018

(65) Prior Publication Data

US 2019/0337610 A1  Nov. 7, 2019

(51) Int. Cl.
*B64C 25/12* (2006.01)
*B64C 25/18* (2006.01)
*B64C 25/34* (2006.01)
*B64C 25/60* (2006.01)

(52) U.S. Cl.
CPC ............. *B64C 25/12* (2013.01); *B64C 25/18* (2013.01); *B64C 25/34* (2013.01); *B64C 25/60* (2013.01); *B64C 2025/125* (2013.01)

(58) Field of Classification Search
CPC ... B64C 25/12; B64C 2025/125; B64C 25/18; B64C 25/20; B64C 25/34
See application file for complete search history.

(56) References Cited

U.S. PATENT DOCUMENTS

| | | | | |
|---|---|---|---|---|
| 2,579,180 A | * | 12/1951 | Eldred | B64C 25/12 244/104 FP |
| 2,732,152 A | * | 1/1956 | Neilson | B64C 25/60 244/104 FP |
| 2,960,289 A | * | 11/1960 | Westcott, Jr. | B64C 25/34 244/104 R |
| 2,997,261 A | * | 8/1961 | Westcott, Jr. | B64C 25/58 244/103 R |

(Continued)

FOREIGN PATENT DOCUMENTS

EP   1041000 A2 * 10/2000 ............. B64C 25/12

OTHER PUBLICATIONS

Mellor, Mitchell, et al.; U.S. Appl. No. 15/444,986, filed Feb. 28, 2017.

(Continued)

*Primary Examiner* — Joseph W Sanderson
(74) *Attorney, Agent, or Firm* — Perman & Green LLP

(57) ABSTRACT

A landing gear for an aircraft comprising a truck support strut, a landing gear retract mechanism coupling the truck support strut to a frame of the aircraft, so that the truck support strut is suspended from the frame by the landing gear retract mechanism, at least one wheel support arm rotatably coupled to the truck support strut, a carrier member coupled to the landing gear retract mechanism and to the truck support strut so that the landing gear retract mechanism drives the carrier member along the truck support strut, and at least one shock absorber, each of the at least one shock absorber being coupled to both a respective one of the (Continued)

at least one wheel support arm and the carrier member so that movement of the carrier member effects rotation of the at least one wheel support arm relative to the truck support strut.

20 Claims, 31 Drawing Sheets

(56) References Cited

U.S. PATENT DOCUMENTS

| | | | | |
|---|---|---|---|---|
| 3,083,937 | A * | 4/1963 | Bainbridge | B64C 25/34 244/102 R |
| 3,533,581 | A * | 10/1970 | Leclercq | B64C 25/12 244/104 R |
| 4,328,939 | A * | 5/1982 | Davies | B64C 25/12 244/102 R |
| 4,345,727 | A * | 8/1982 | Brown | B64C 25/12 244/102 R |
| 5,110,068 | A * | 5/1992 | Grande | B64C 25/34 244/100 R |
| 5,429,323 | A * | 7/1995 | Derrien | B64C 25/14 244/102 R |
| 6,182,925 | B1 | 2/2001 | Kilner et al. | |
| 6,360,990 | B1 * | 3/2002 | Grossman | B64C 25/12 244/102 R |
| 6,481,668 | B2 * | 11/2002 | Grossman | B64C 25/12 244/102 R |
| 8,104,711 | B2 * | 1/2012 | Bennett | B64C 25/58 244/102 SL |
| 8,448,900 | B2 | 5/2013 | Mellor et al. | |
| 8,523,107 | B2 * | 9/2013 | Salmon | B64C 25/12 244/102 A |
| 8,998,133 | B2 | 4/2015 | Cottet | |
| 9,073,629 | B2 * | 7/2015 | Ducos | B64C 25/10 |
| 9,205,917 | B2 * | 12/2015 | Acks | B64C 25/20 |
| 10,112,699 | B2 * | 10/2018 | Simonneaux | B64F 5/10 |
| 2002/0056786 | A1 * | 5/2002 | Grossman | B64C 25/12 244/102 R |
| 2009/0050736 | A1 * | 2/2009 | Bennett | B64C 25/58 244/102 R |
| 2010/0116930 | A1 | 5/2010 | Griffin | |
| 2010/0219290 | A1 | 9/2010 | Luce | |
| 2011/0233327 | A1 | 9/2011 | Mellor et al. | |
| 2012/0111999 | A1 * | 5/2012 | Acks | B64C 25/34 244/102 A |
| 2012/0126055 | A1 * | 5/2012 | Lindahl | B64C 25/60 244/104 FP |
| 2012/0168561 | A1 * | 7/2012 | Salmon | B64C 25/18 244/102 A |
| 2013/0068884 | A1 * | 3/2013 | Ducos | B64C 25/34 244/102 A |
| 2013/0119196 | A1 * | 5/2013 | Lindahl | F15B 15/16 244/100 R |
| 2013/0140399 | A1 * | 6/2013 | Ducos | B64C 25/10 244/104 FP |
| 2014/0346273 | A1 * | 11/2014 | Nelson | B64C 25/34 244/102 A |
| 2018/0065733 | A1 * | 3/2018 | Mellor | B64C 25/26 |
| 2018/0362150 | A1 * | 12/2018 | Sakota | B64C 25/12 |
| 2019/0002092 | A1 * | 1/2019 | Thompson | B64C 25/34 |
| 2019/0016319 | A1 * | 1/2019 | Thompson | B60T 8/1875 |
| 2019/0308720 | A1 * | 10/2019 | Antoni | B64C 25/12 |

OTHER PUBLICATIONS

Cottet, Justin, et al.; U.S. Appl. No. 15/445,652, filed Feb. 28, 2017.
Simpson, Mark, et al.; U.S. Appl. No. 15/445,836, filed Feb. 28, 2017.
Federal Aviaton Administration, "Aviation Maintenance Technician Handbook-Airframe, Chapter 13", (2013), downloaded from faa.gov on Aug. 9, 2016.
Curry, Norman S. "Landing Gear Design Handbook" Lockheed-Georgia Company; First Edition; Jan. 1982, Revised: Jul. 1984.
Cottet, Justin, et al.; U.S. Appl. No. 15/415,346, filed Feb. 28, 2017.
Dahl, Bruce, et al.; U.S. Appl. No. 15/611,844, filed Jun. 1, 2017.
Mellor, Mitchell; U.S. Appl. No. 15/484,646, filed Apr. 11, 2017.

* cited by examiner

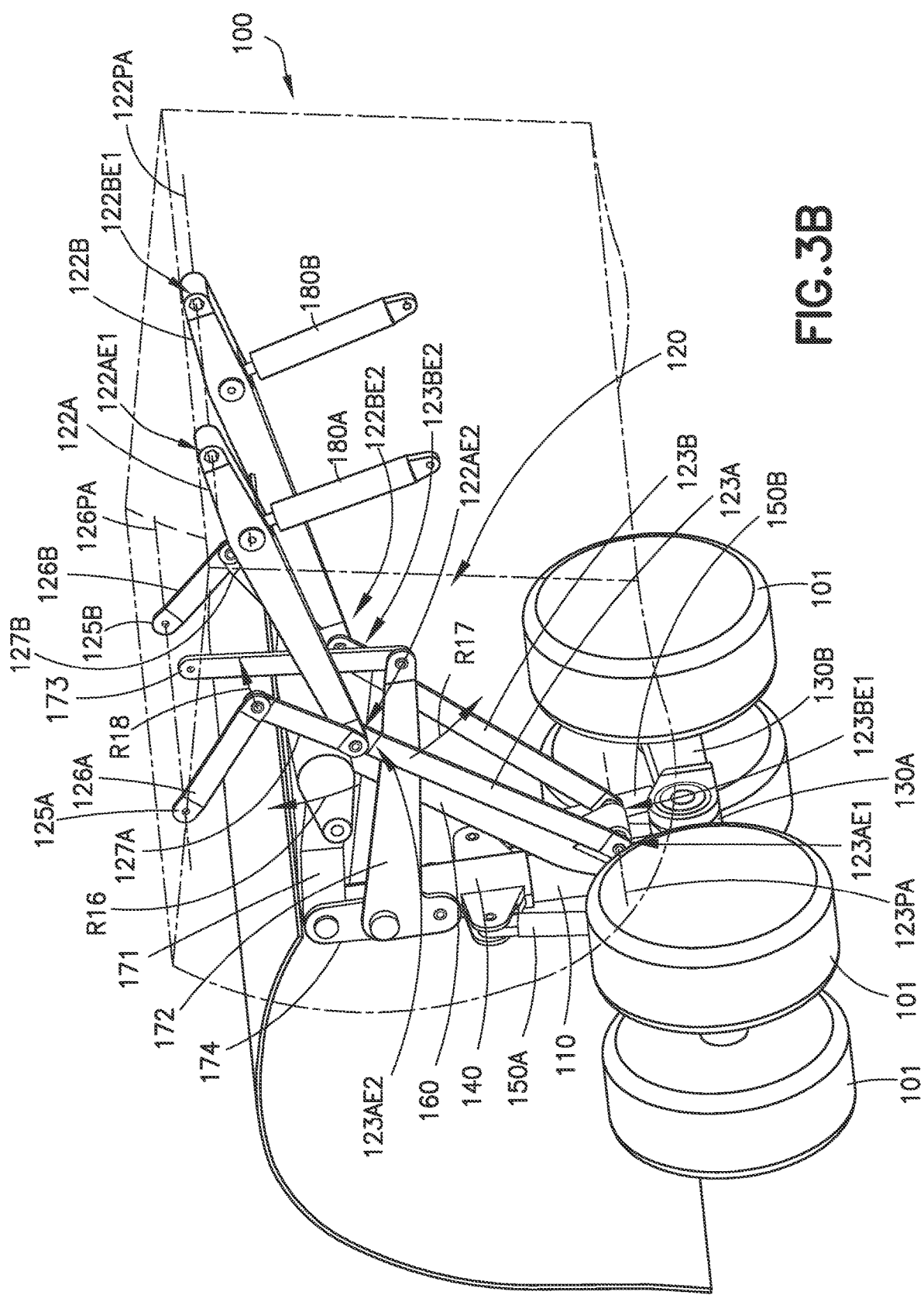

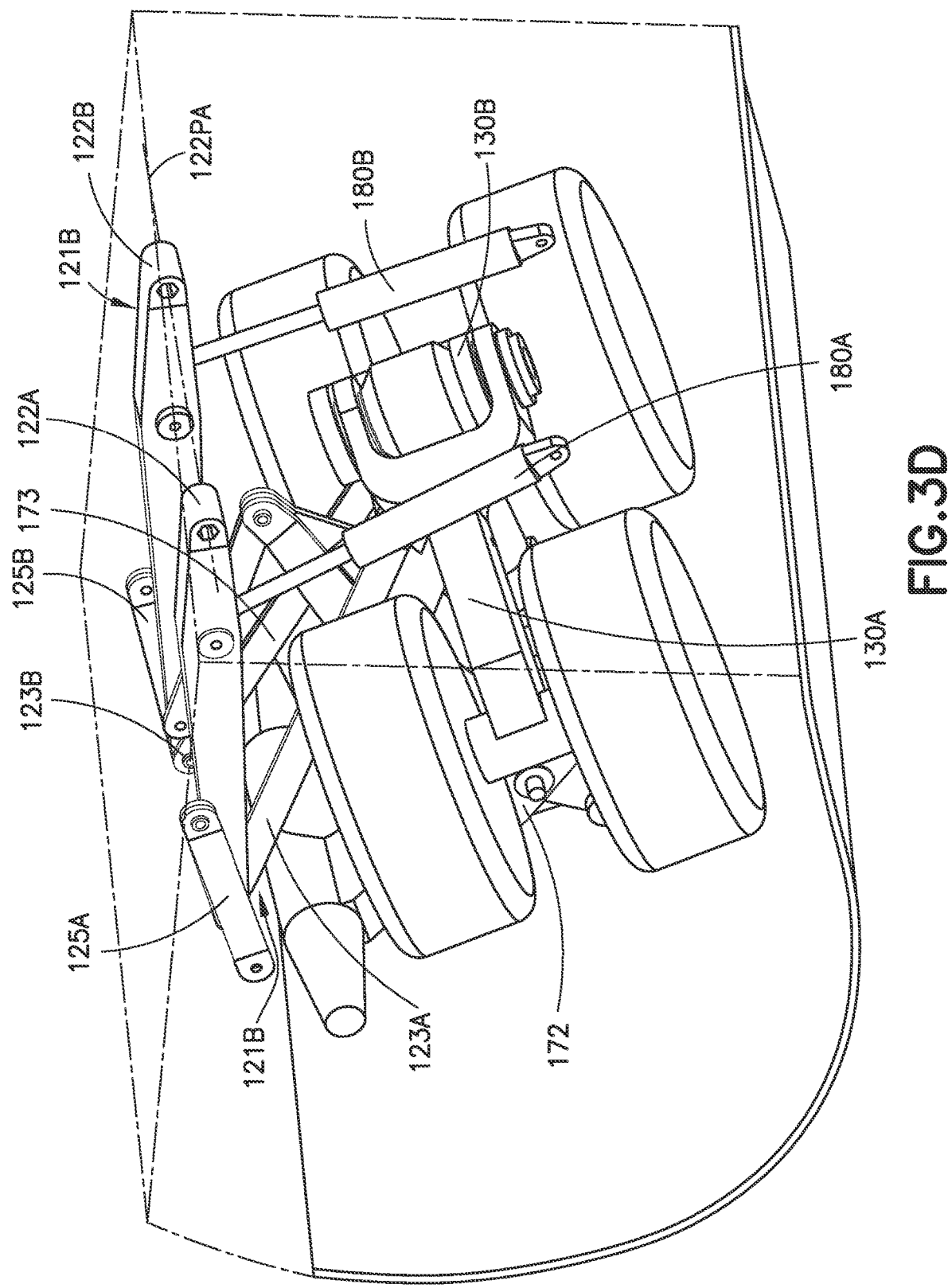

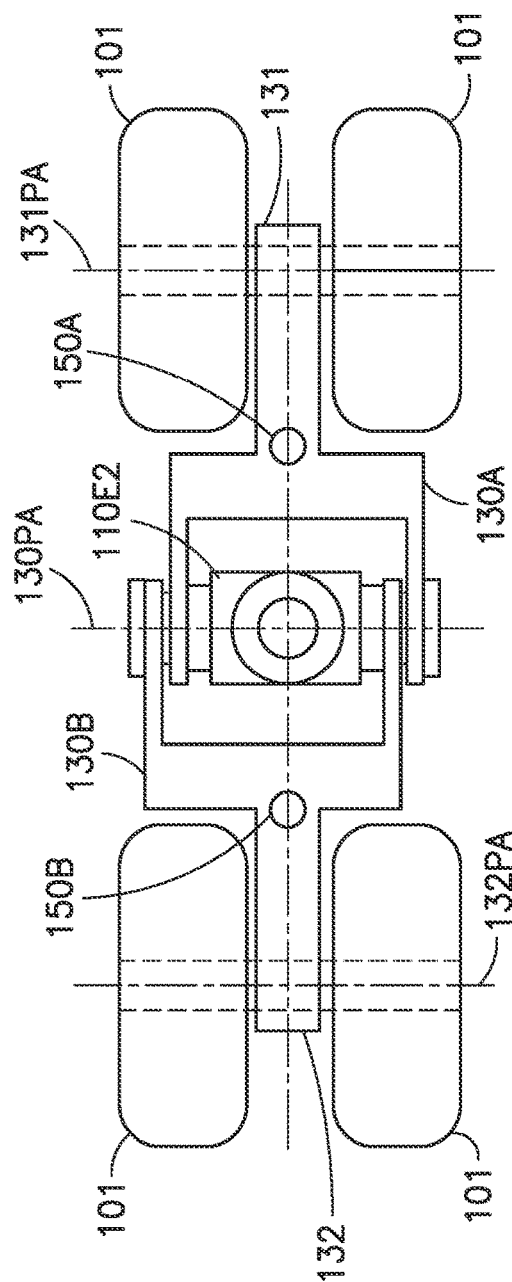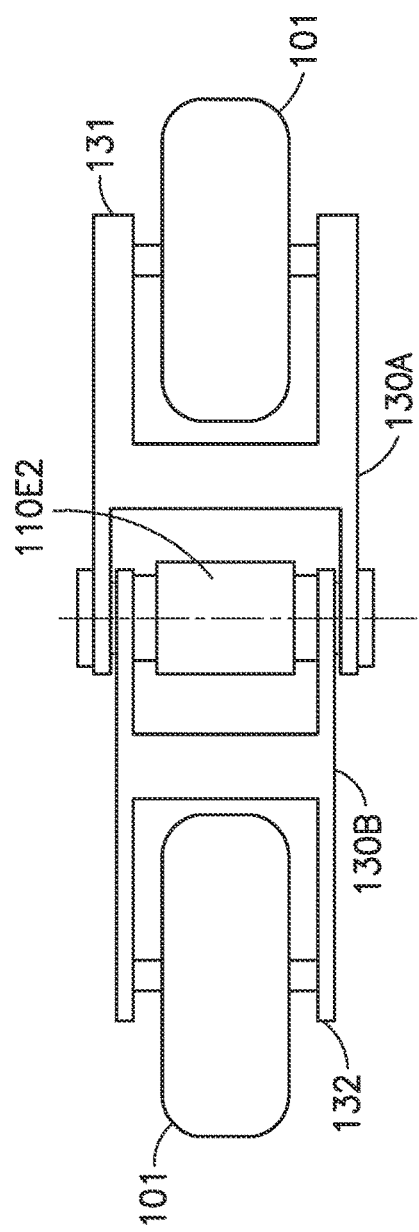

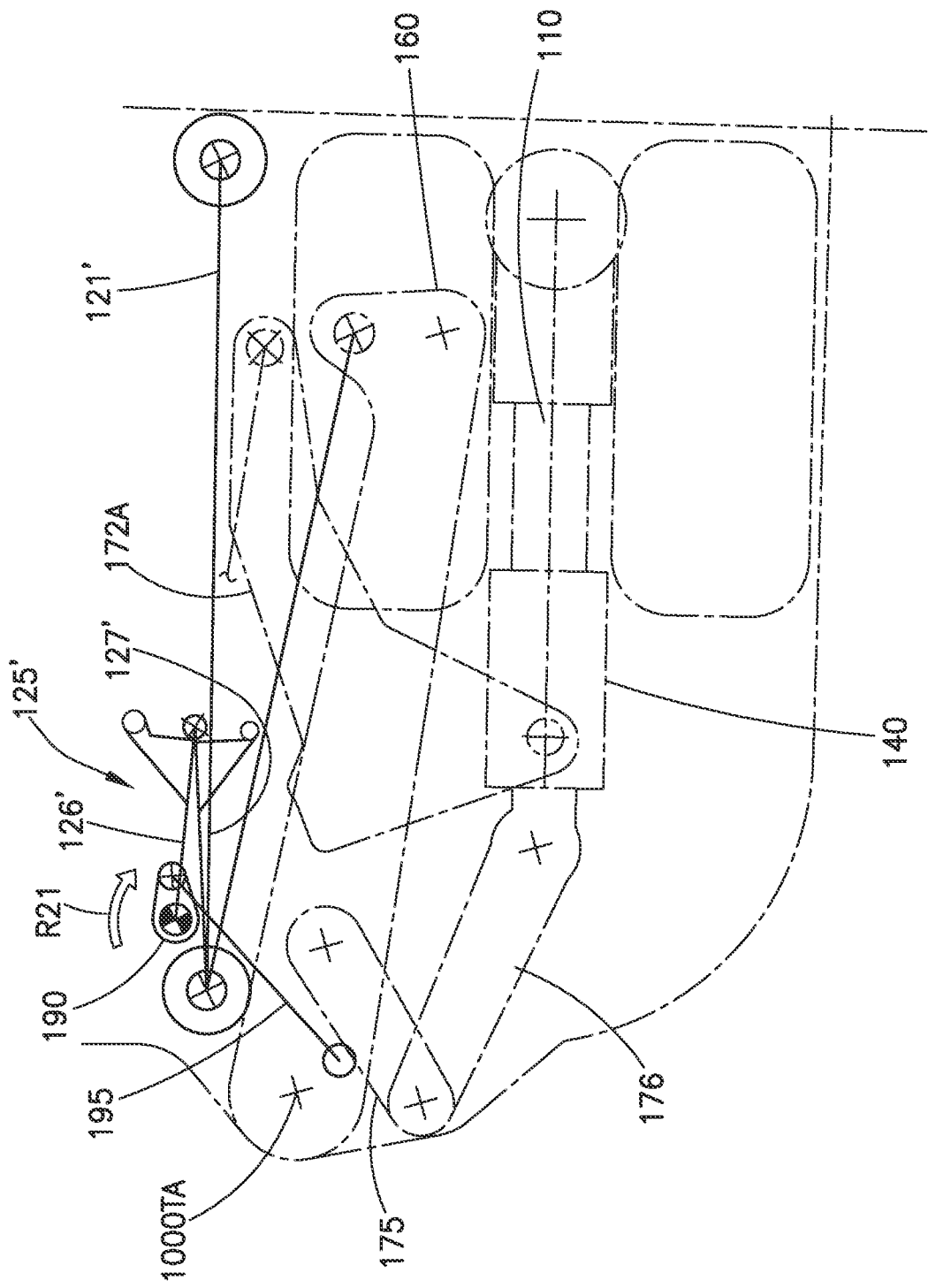

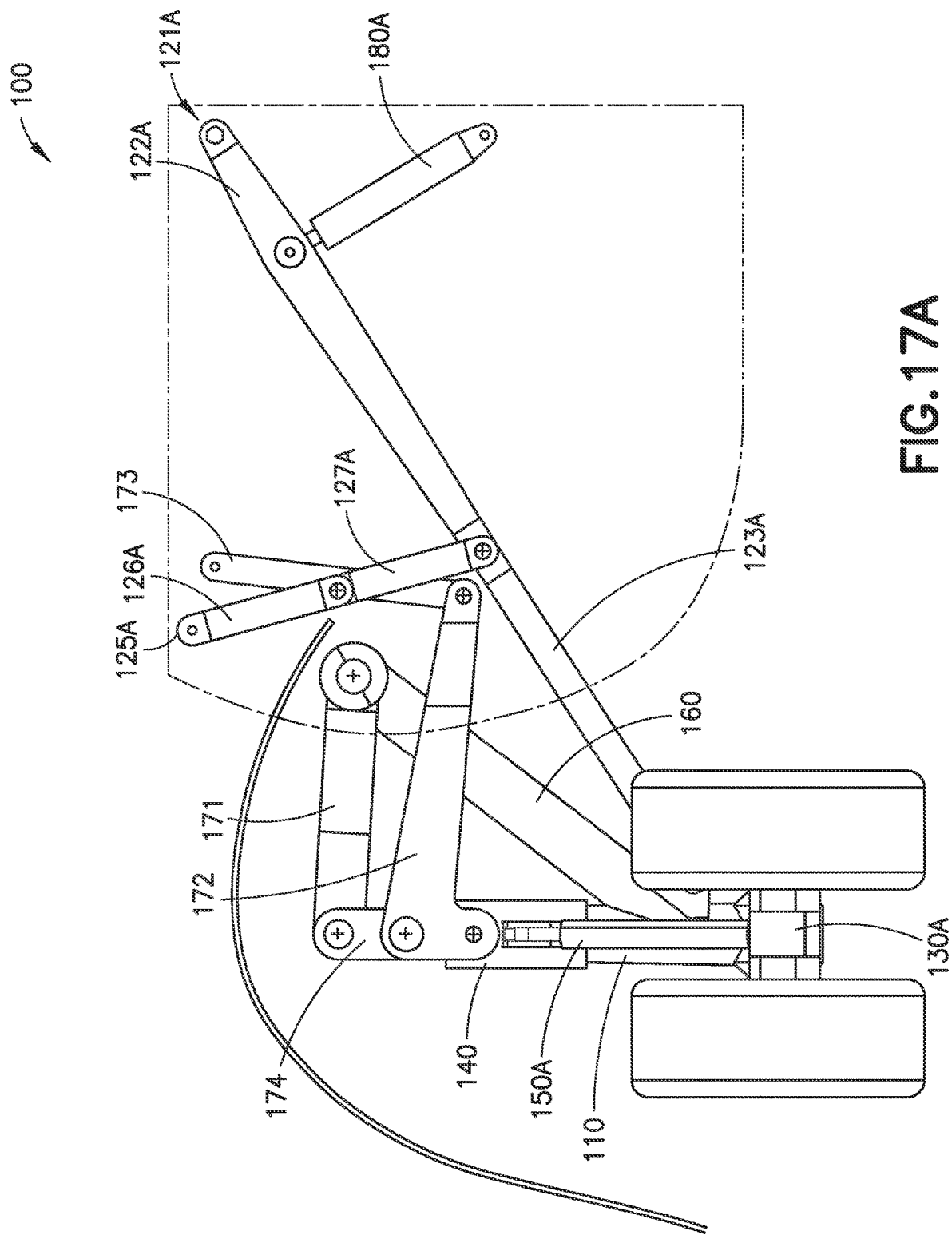

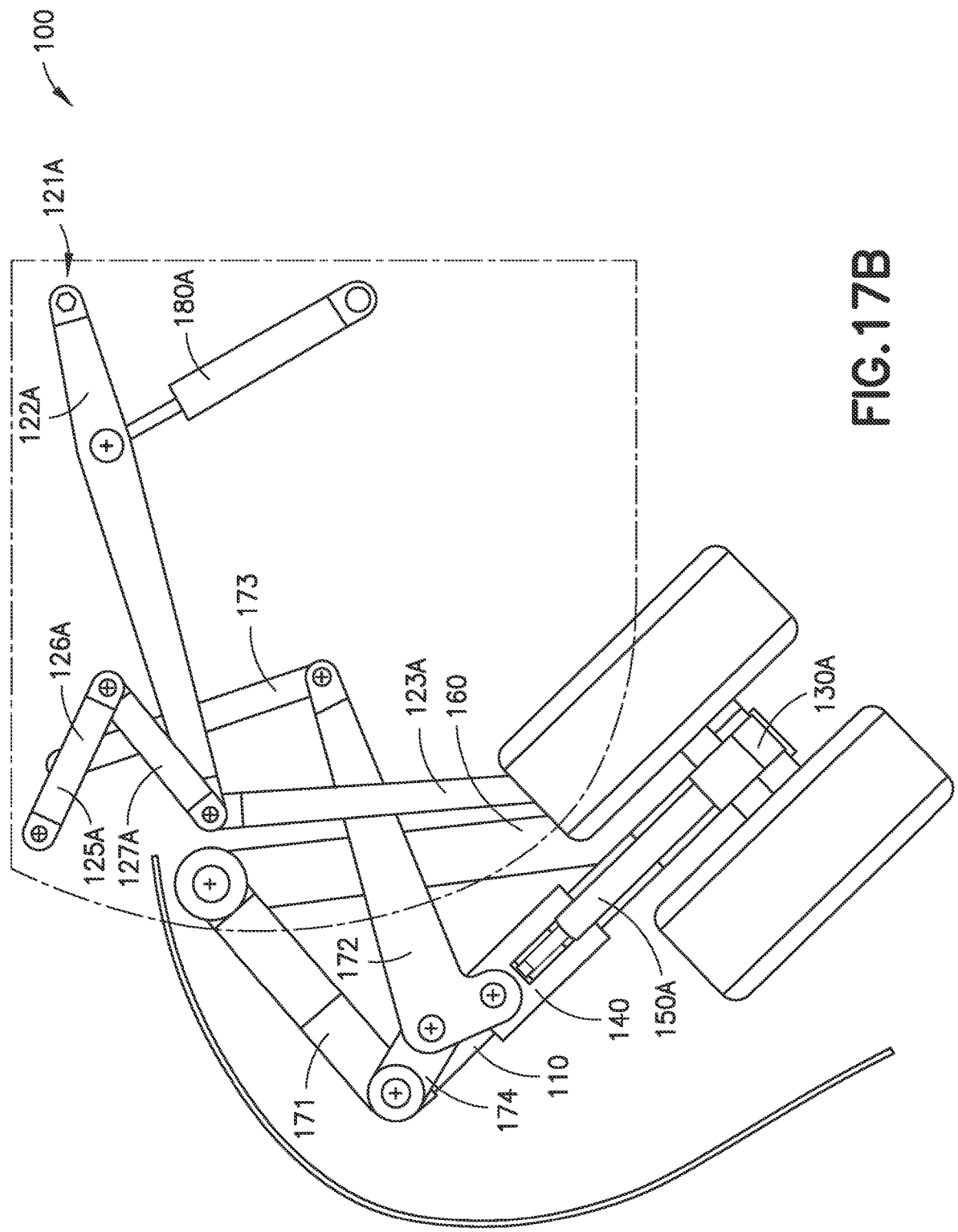

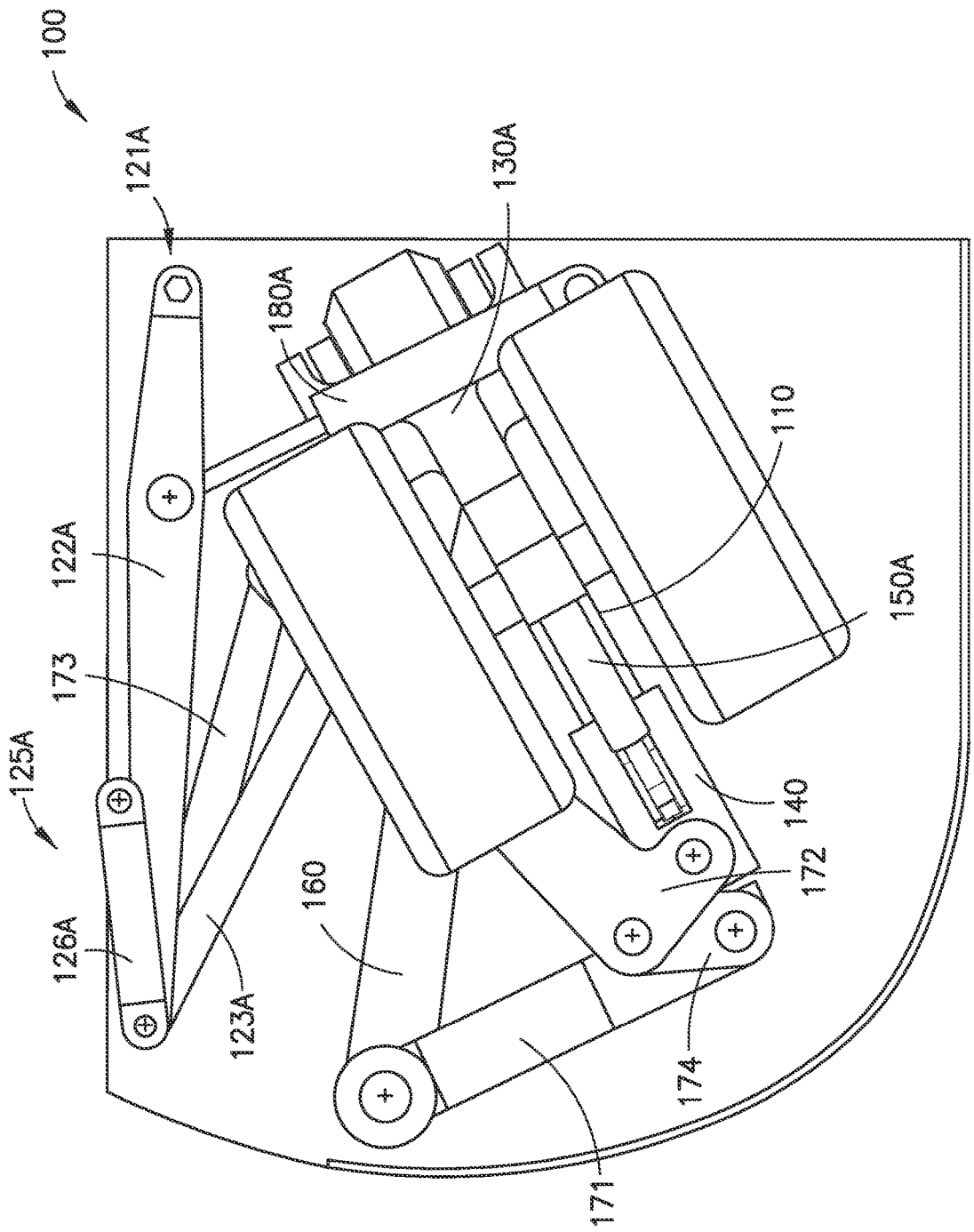

BODY MOUNTED SHRINKING LANDING GEAR

BACKGROUND

1. Field

The exemplary embodiments generally relate to aircraft landing gear components and systems and in particular to landing gear assemblies for extending and retracting landing gear.

2. Brief Description of Related Developments

Aircraft generally include landing gear to facilitate take-off, landing, and taxi. It is generally desired to have tall landing gear for various reasons. These reasons include generating a greater angle of rotation (e.g. angle of attack) of the aircraft during take-off and landing, providing more ground clearance to mount engines, increasing the ride height of the aircraft, etc. In order to accommodate the tall landing gear, the landing gear is generally positioned and attached to the aircraft at a mid-section portion of the fuselage where the wings are attached to the aircraft. Generally, the landing gear is attached at this point of the aircraft due to various structural and integration issues. For example, the portion of the fuselage of the aircraft where the wings are attached is typically the widest part of the aircraft which can accommodate tall landing gear. Additionally, the landing gear may be moved further outboard, from the aircraft fuselage, along the wings to compensate for increased length of the landing gear on stowage.

In some instances, the landing gear is directly attached to structural elements of the wing, such as within the yehudi. Attaching the landing gear within the yehudi may result in increased weight for the aircraft. Further the presence of the yehudi may affect aerodynamics and fuel efficiency of the aircraft.

SUMMARY

The following is a non-exhaustive list of examples, which may or may not be claimed, of the subject matter according to the present disclosure.

One example of the subject matter according to the present disclosure relates to a landing gear for an aircraft, the landing gear comprising a truck support strut having a first end and a second end separated by a longitudinal axis, a landing gear retract mechanism coupling the truck support strut to a frame of the aircraft, so that the first end of the truck support strut is suspended from the frame by the landing gear retract mechanism, at least one wheel support arm rotatably coupled to the second end of the truck support strut, the at least one wheel support arm having at least one wheel pivot axis, a carrier member coupled to the landing gear retract mechanism and to the truck support strut so that the landing gear retract mechanism drives the carrier member along the longitudinal axis of the truck support strut, and at least one shock absorber, each of the at least one shock absorber being coupled to both a respective one of the at least one wheel support arm and the carrier member so that movement of the carrier member along the longitudinal axis by the landing gear retract mechanism effects rotation of the at least one wheel support arm relative to the truck support strut so that the at least one wheel support arm rotates towards or away from the first end of the truck support strut.

Another example of the subject matter according to the present disclosure relates to an aircraft comprising a frame forming a fuselage that has a longitudinal length and a lateral width, wings coupled to the frame, and a landing gear coupled to the frame for stowage within the fuselage, the landing gear including a truck support strut having a first end and a second end separated by a longitudinal axis, a landing gear retract mechanism coupling the truck support strut to a frame of the aircraft, so that the first end of the truck support strut is suspended from the frame by the landing gear retract mechanism, at least one wheel support arm rotatably coupled to the second end of the truck support strut, the at least one wheel support arm having at least one wheel pivot axis, a carrier member coupled to the landing gear retract mechanism and to the truck support strut so that the landing gear retract mechanism drives the carrier member along the longitudinal axis of the truck support strut, and at least one shock absorber, each of the at least one shock absorber being coupled to both a respective one of the at least one wheel support arm and the carrier member so that movement of the carrier member along the longitudinal axis by the landing gear retract mechanism effects rotation of the at least one wheel support arm relative to the truck support strut so that the at least one wheel support arm rotates towards or away from the first end of the truck support strut.

Still another example of the subject matter according to the present disclosure relates to a method for operating a landing gear of an aircraft, the method comprising operating a landing gear retract mechanism so that a carrier member, coupled to the landing gear retract mechanism and to a truck support strut, is driven along a longitudinal axis of the truck support strut, where the truck support strut has a first end and a second end separated by the longitudinal axis and the landing gear retract mechanism couples the truck support strut to a frame of the aircraft, so that the first end of the truck support is suspended from the frame by the landing gear retract mechanism, and moving, with the carrier member, at least one shock absorber so that movement of the carrier member along the longitudinal axis by the actuation mechanism effects rotation of at least one wheel support arm relative to the truck support strut so that the at least one wheel support arm rotates towards or away from the first end of the truck support strut, where each of the at least one shock absorber is coupled to both the at least one wheel support arm and the carrier member and the at least one wheel support arm is rotatably coupled to the second end of the truck support strut.

BRIEF DESCRIPTION OF THE DRAWINGS

Figure 1A:
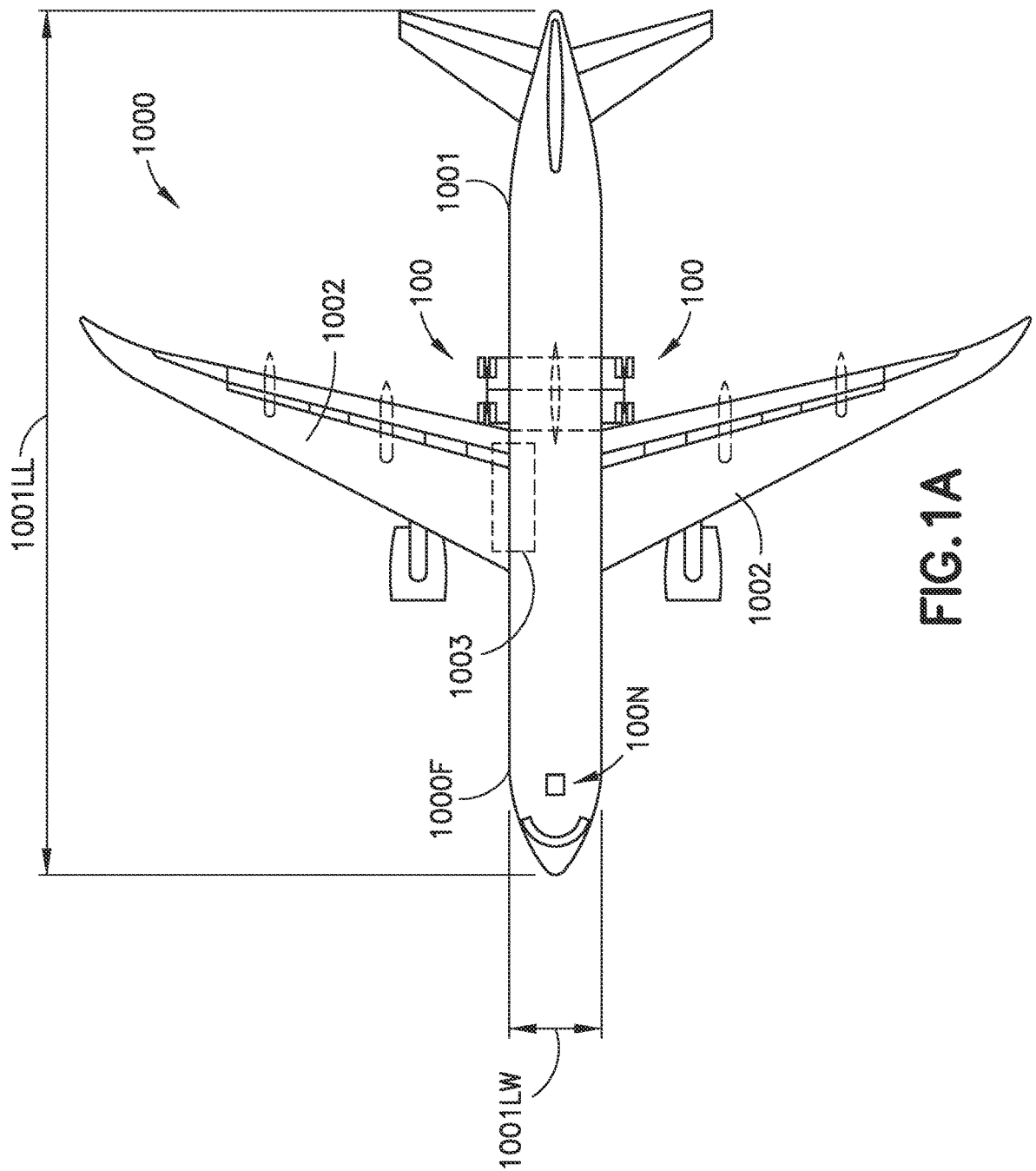
Figure 1B:
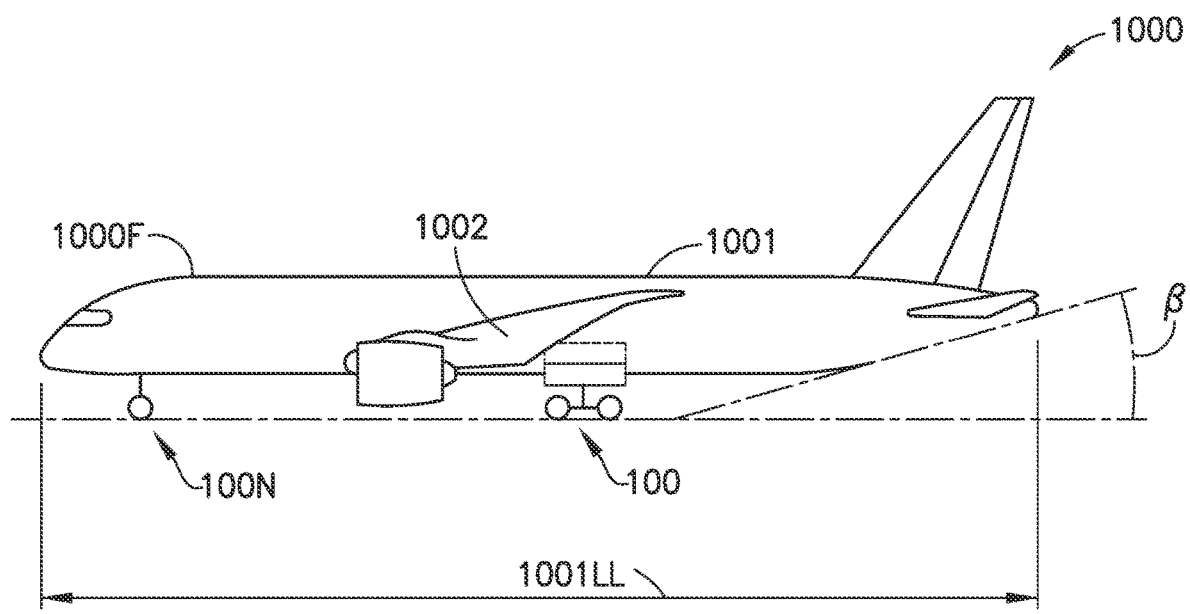
Figure 1C:
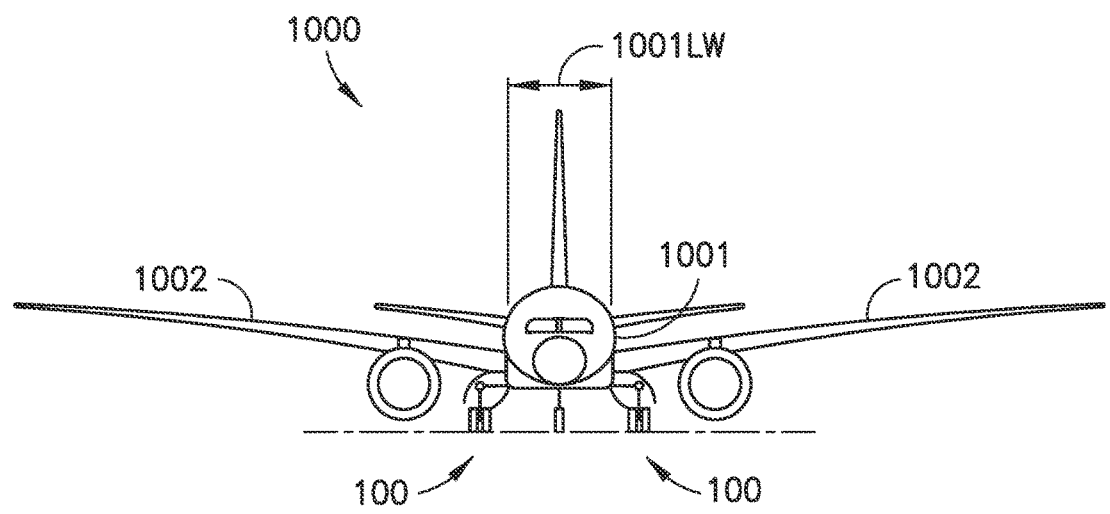
Figure 2:
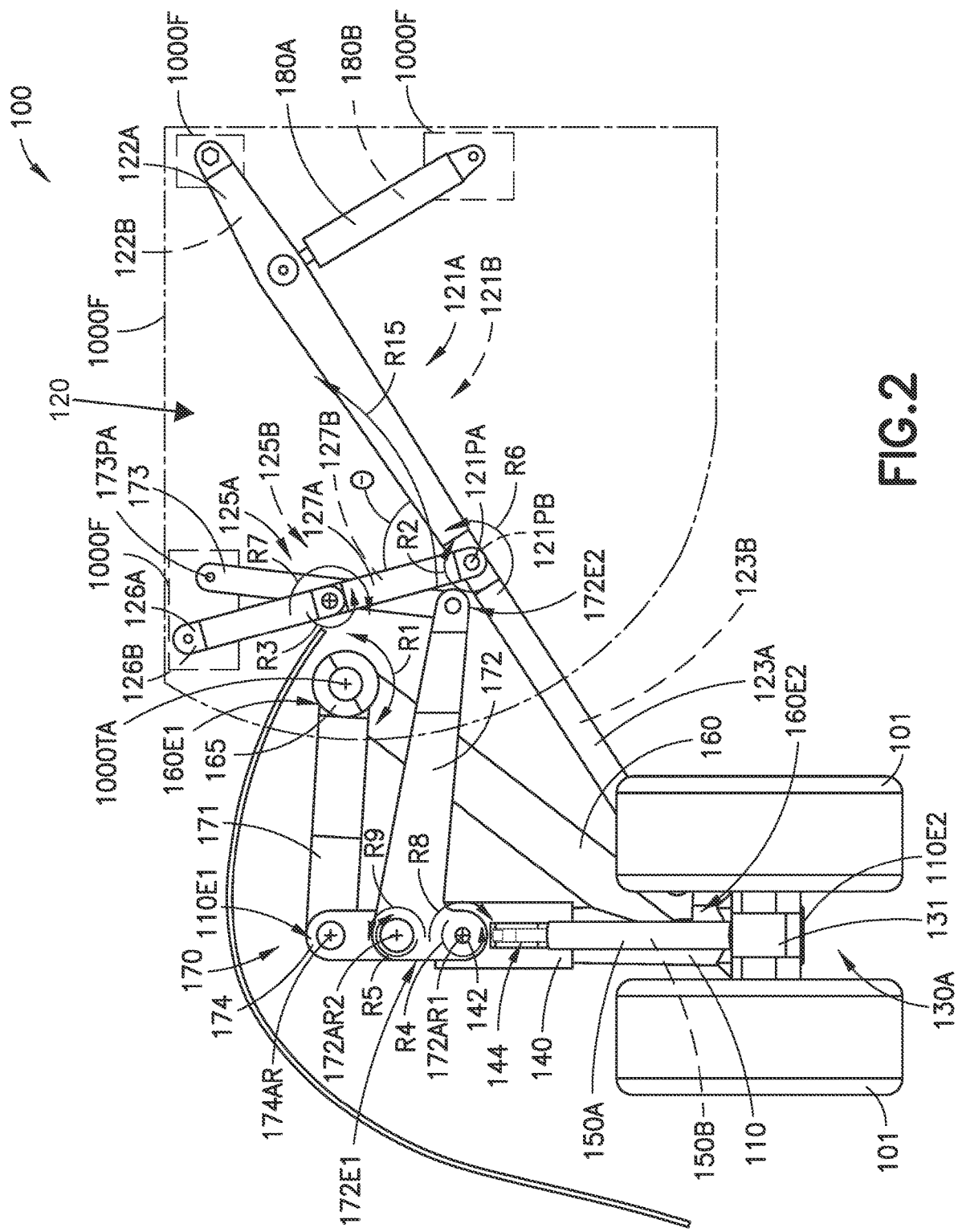
Figure 4:
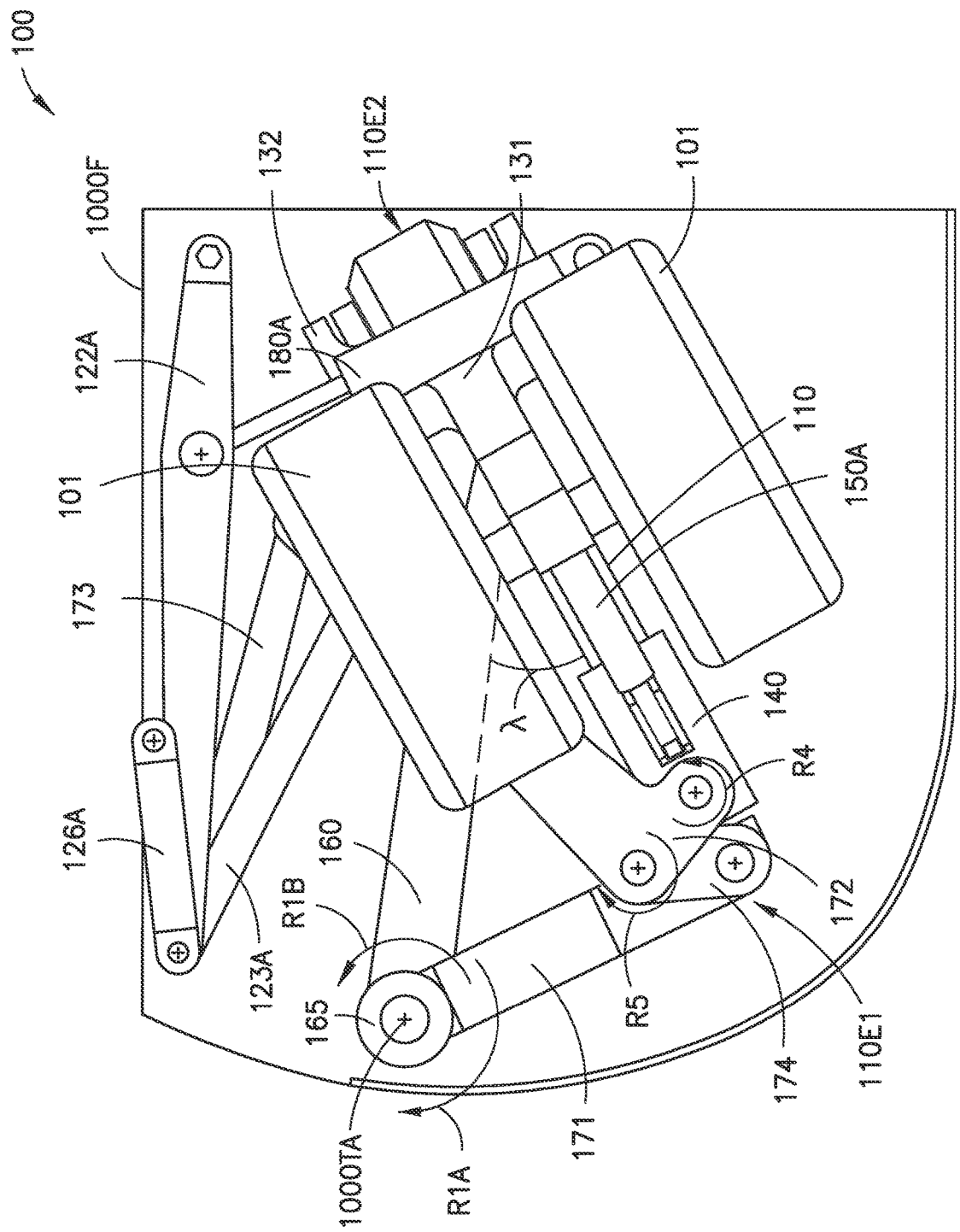
Figure 5:
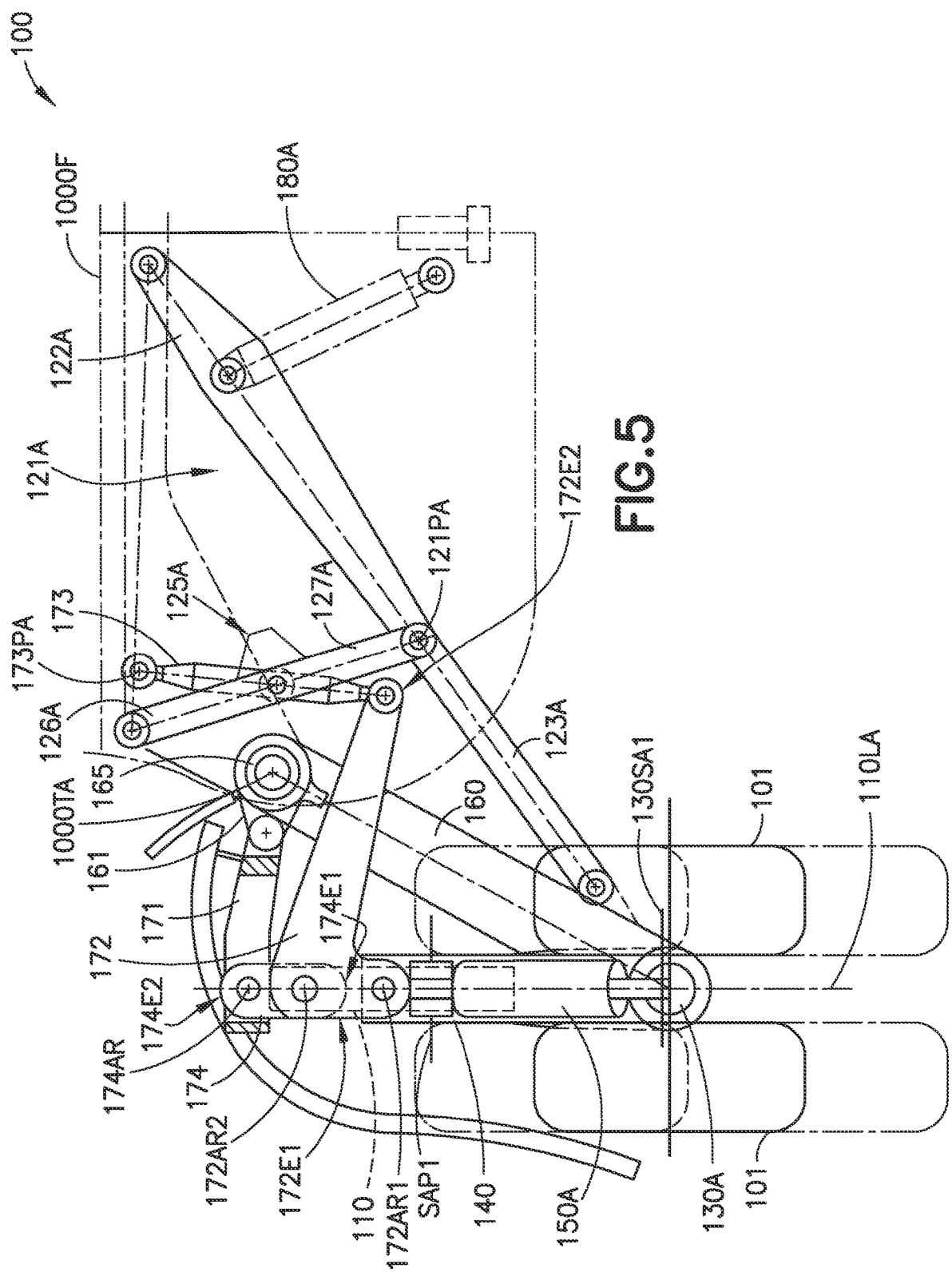
Figure 6:
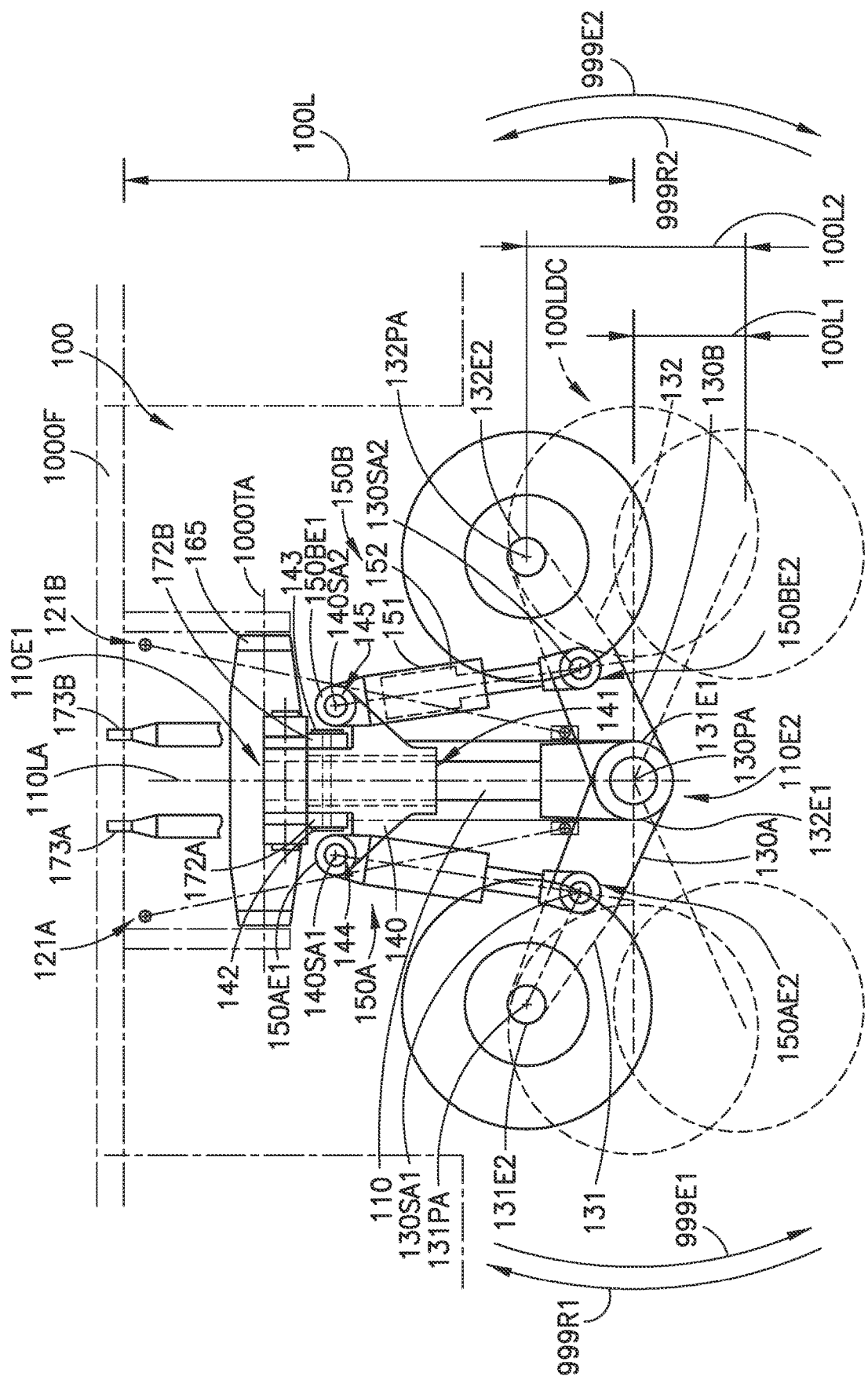
Figure 7:
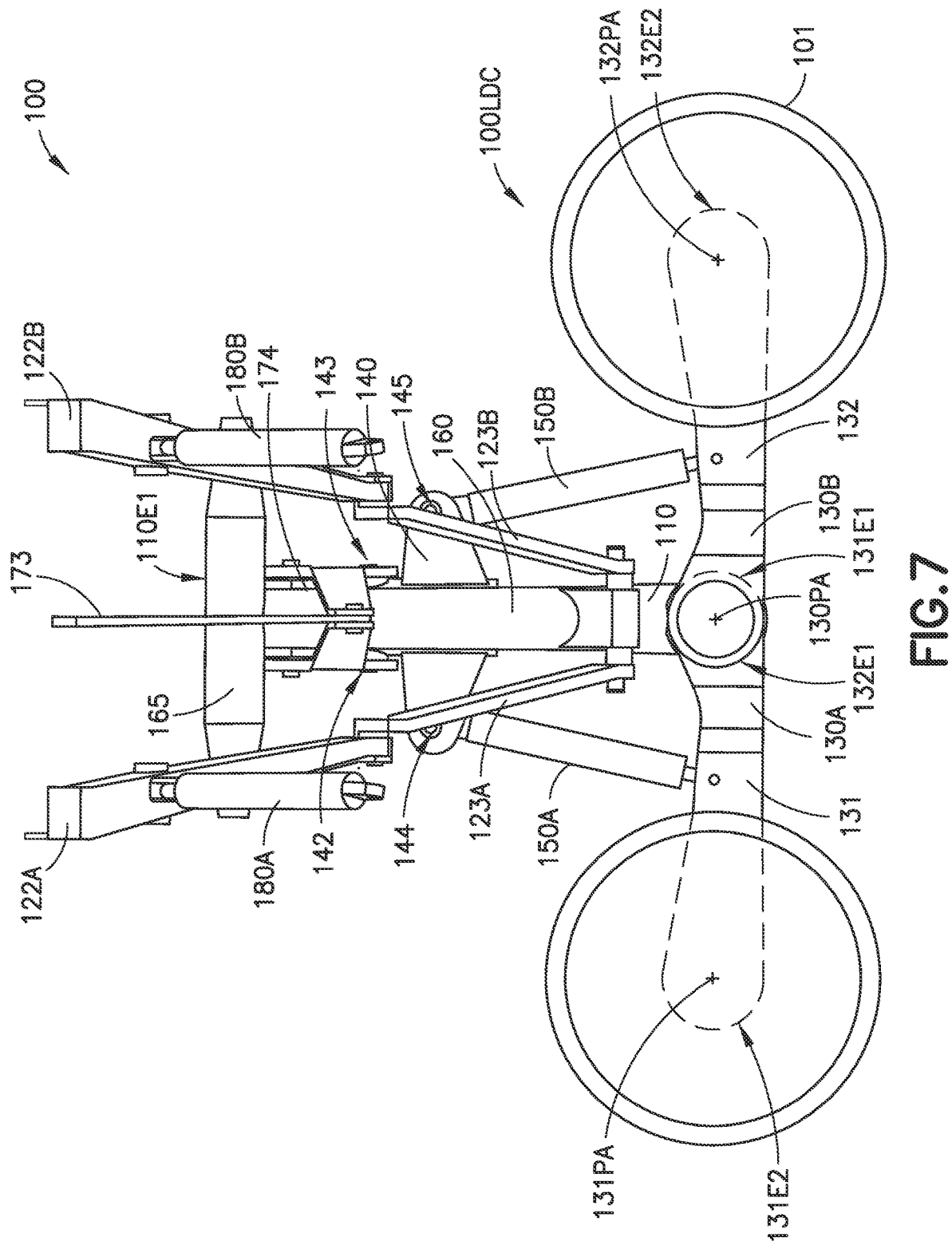
Figure 9:
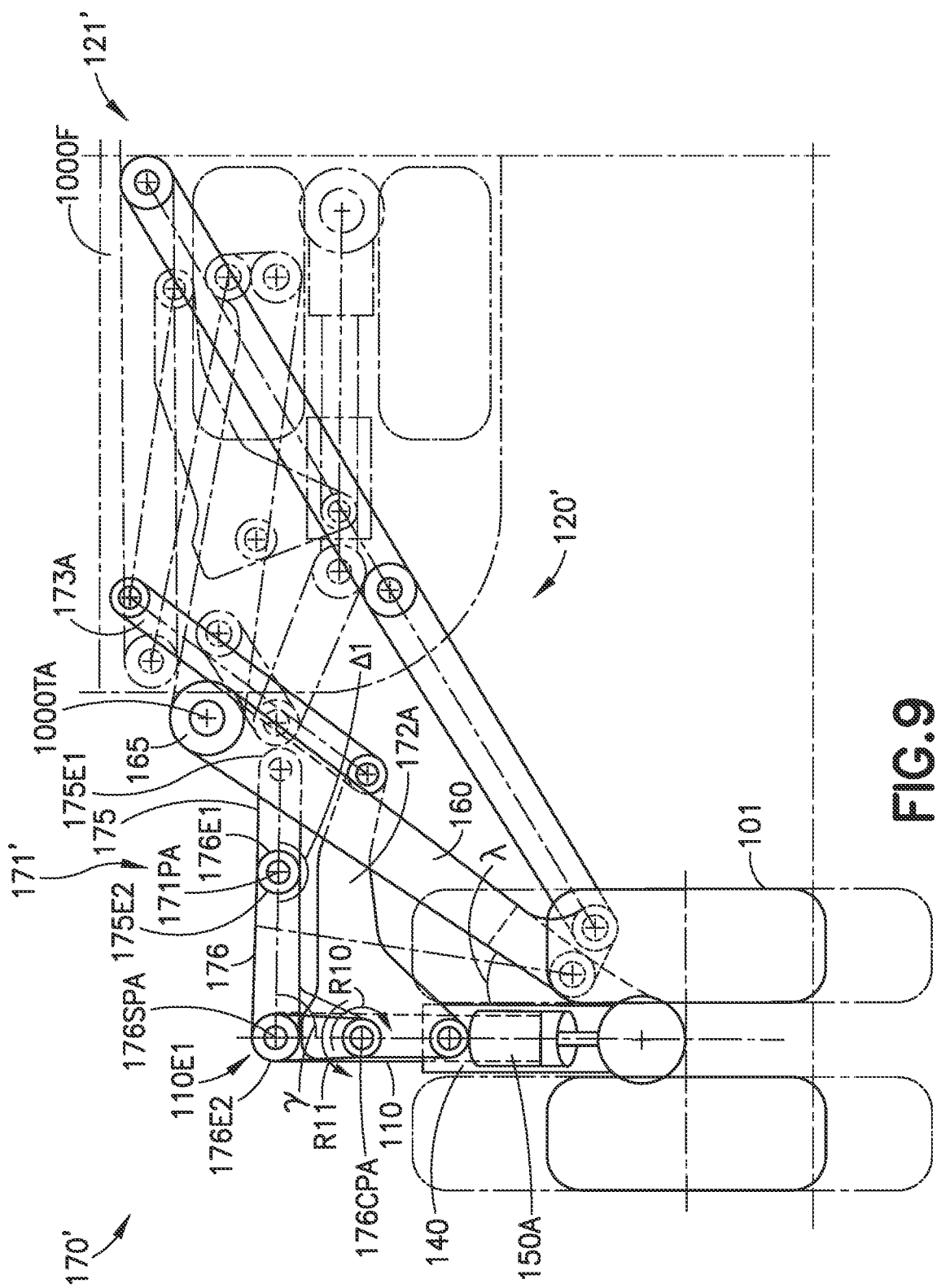
Figure 10:
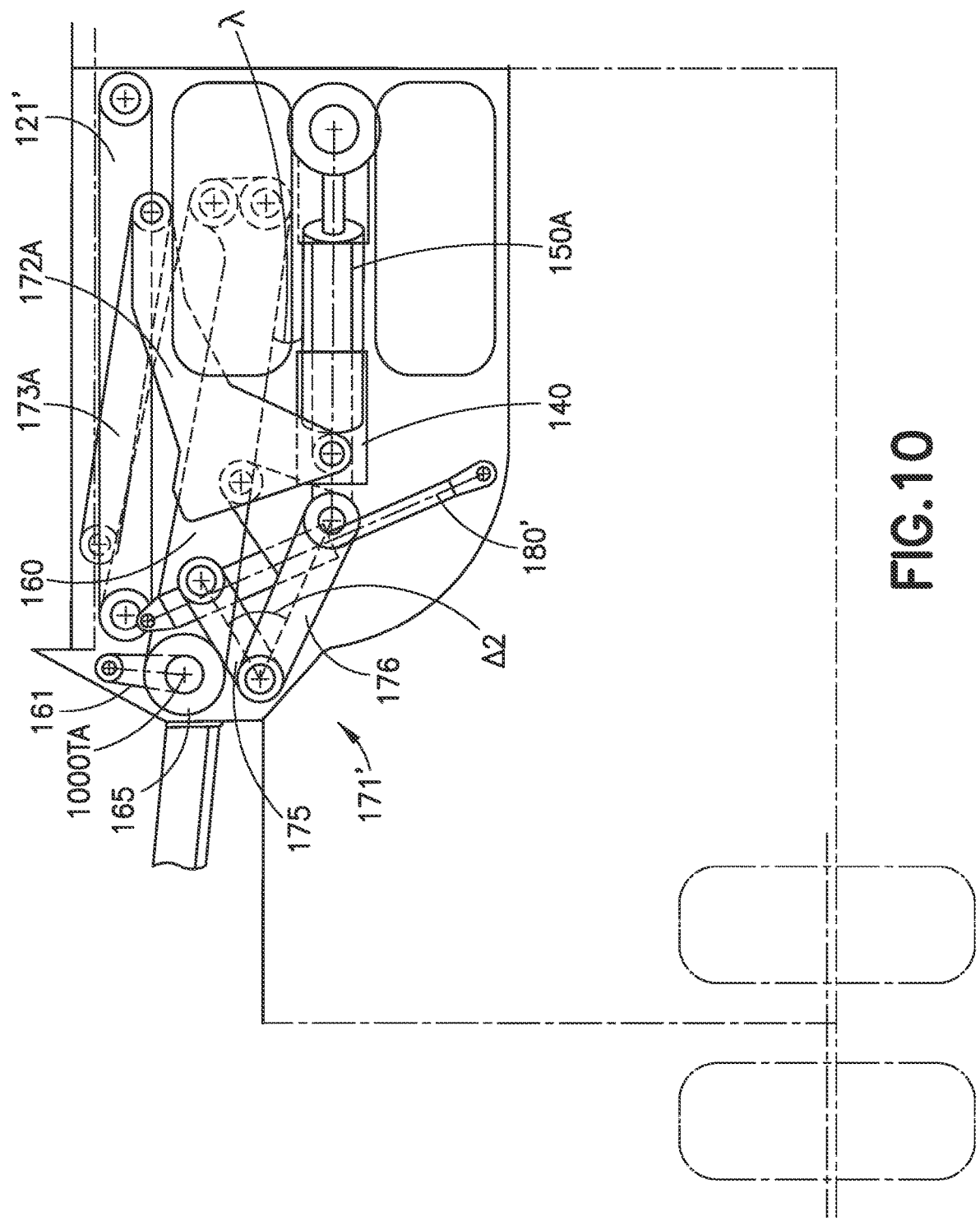
Figure 11:
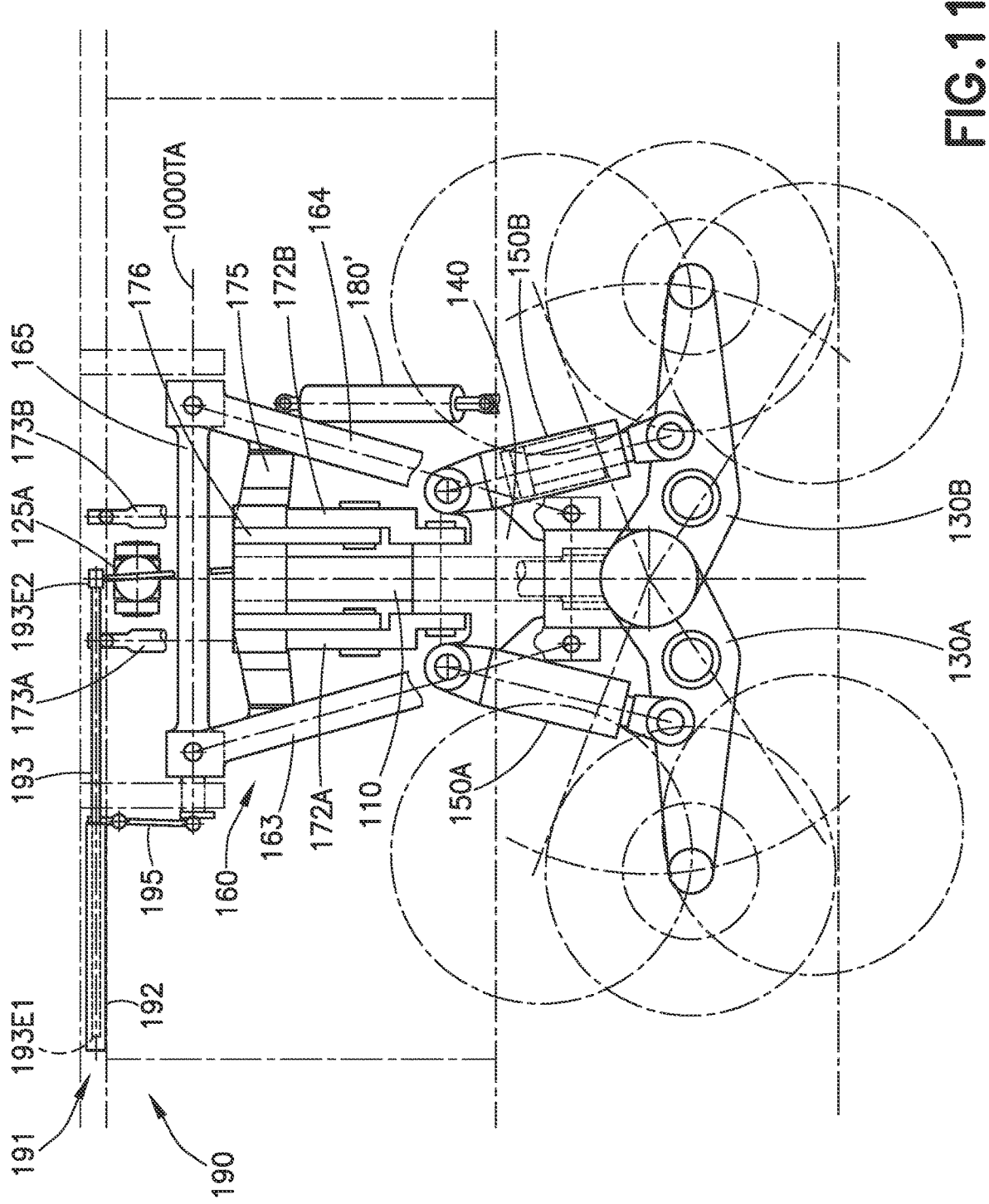
Figure 12:
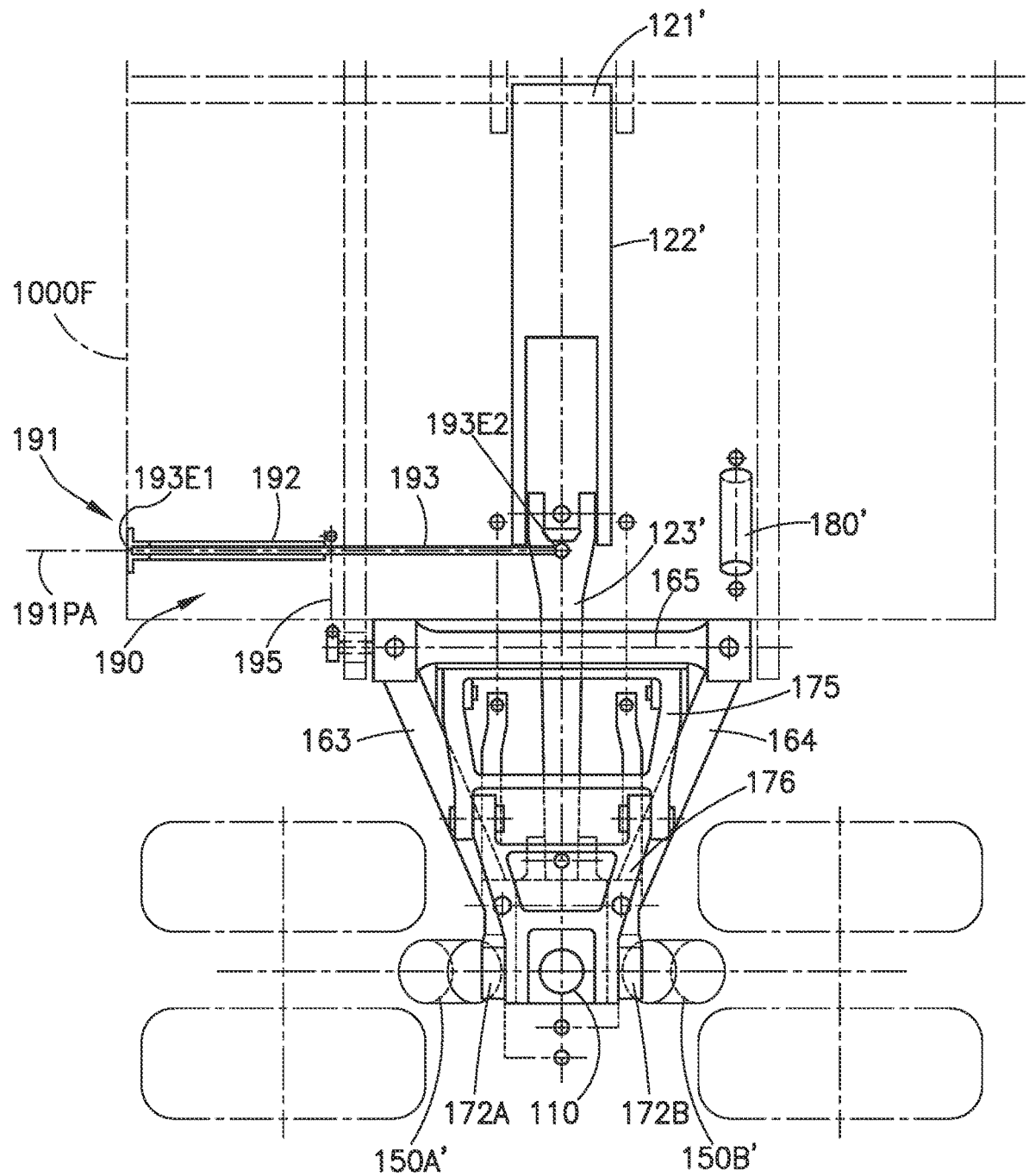
Figure 13:
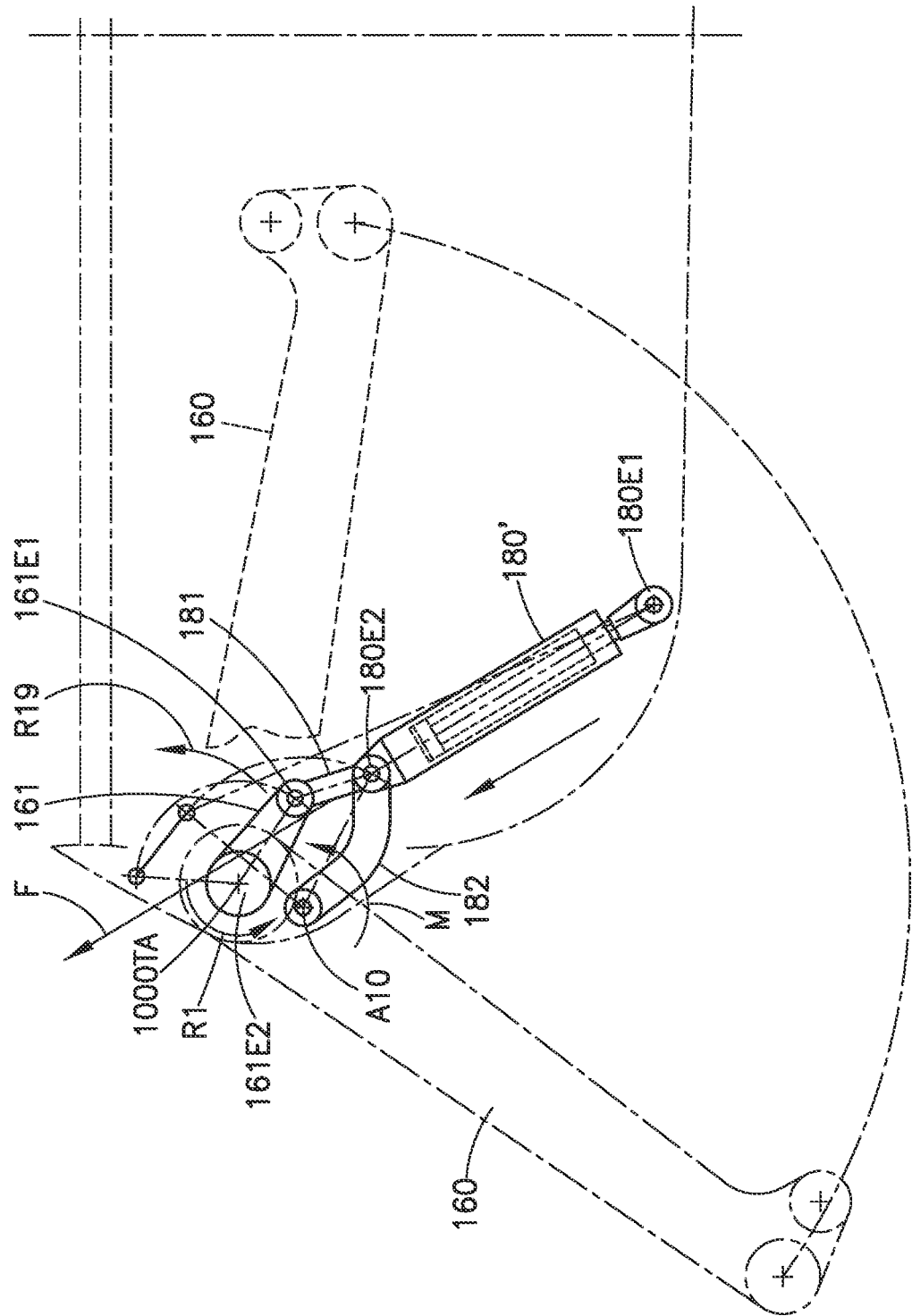
Figure 14:
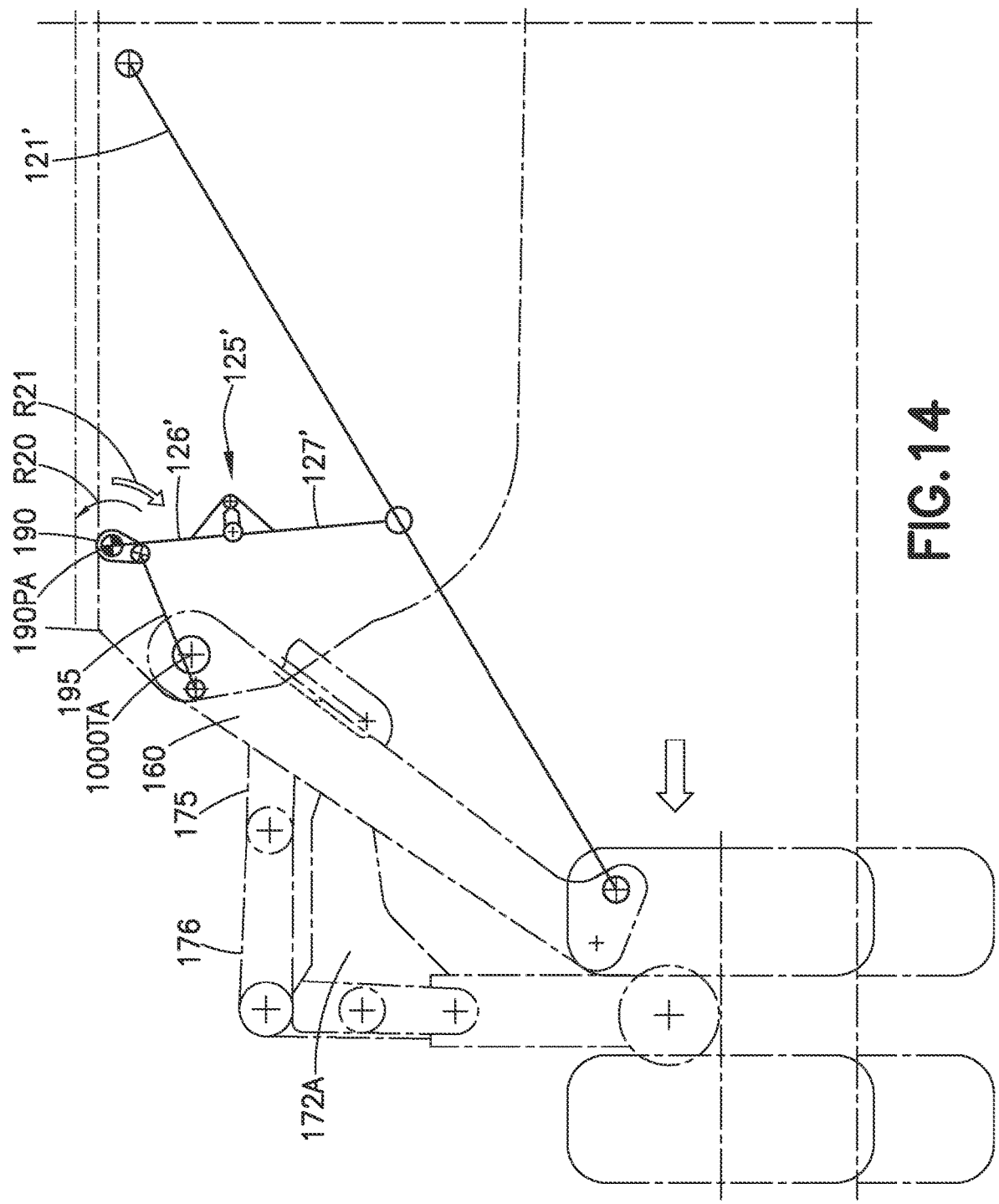
Figure 15:
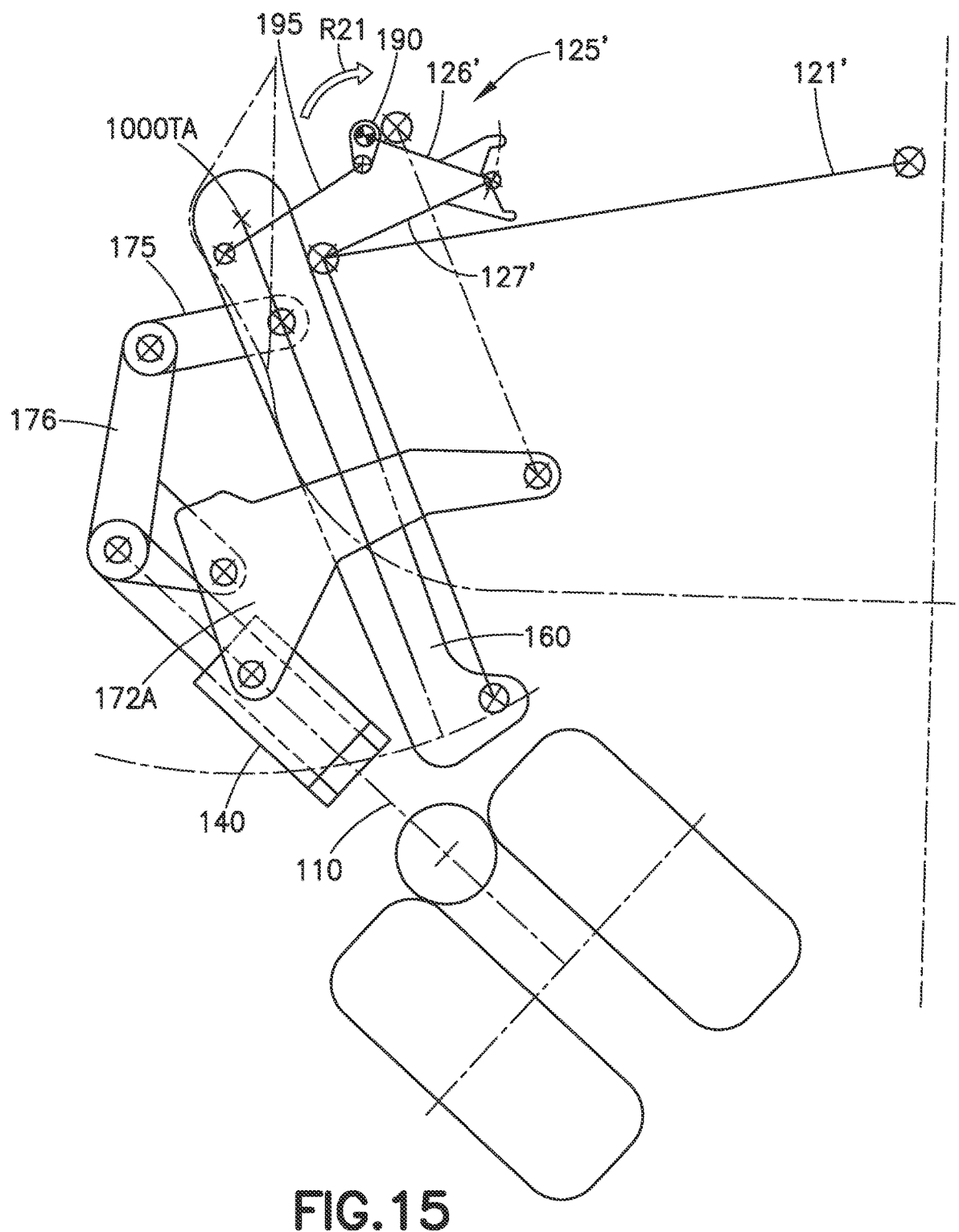
Figure 17C:
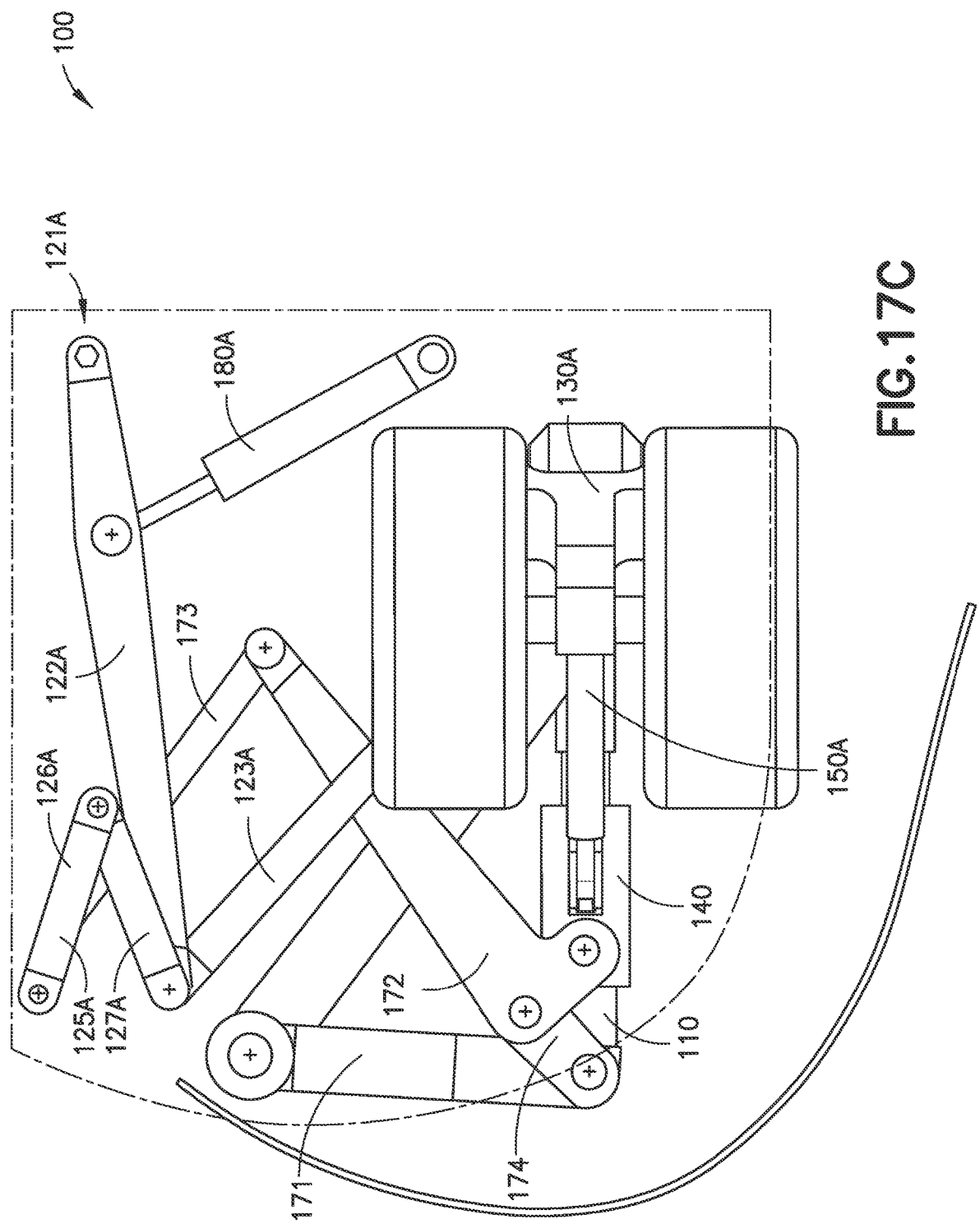
Figure 18A:
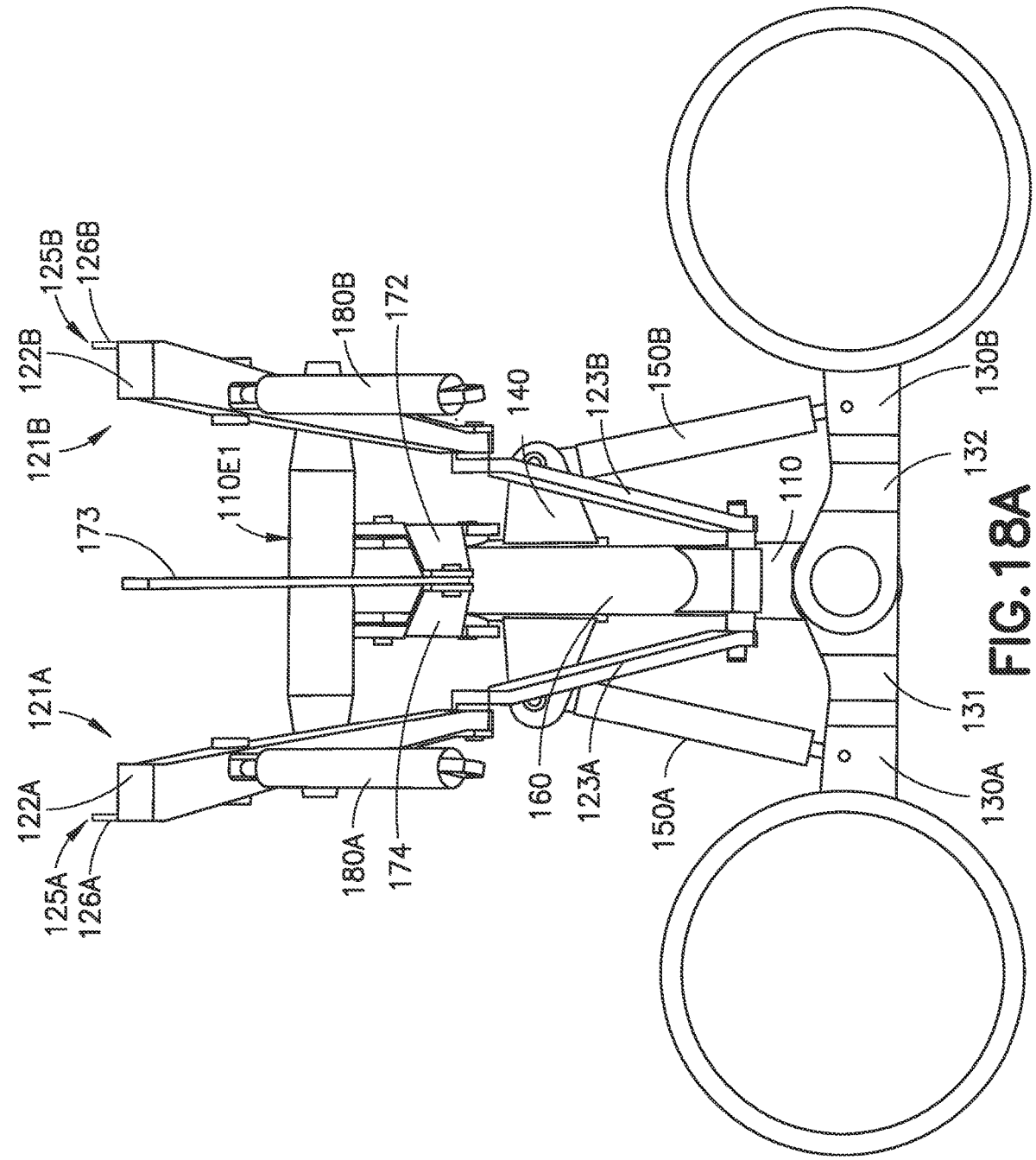
Figure 18B:
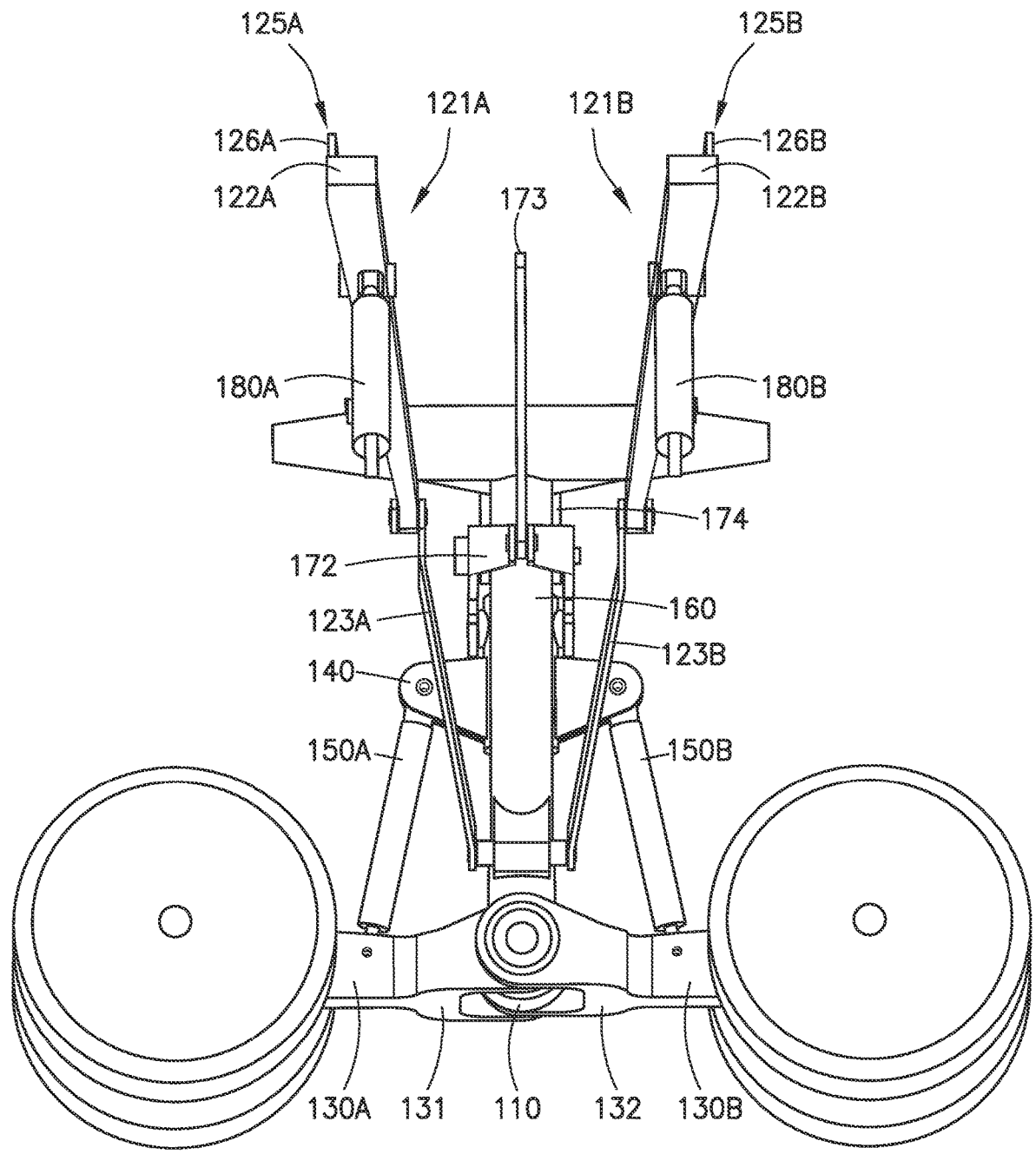
Figure 18C:
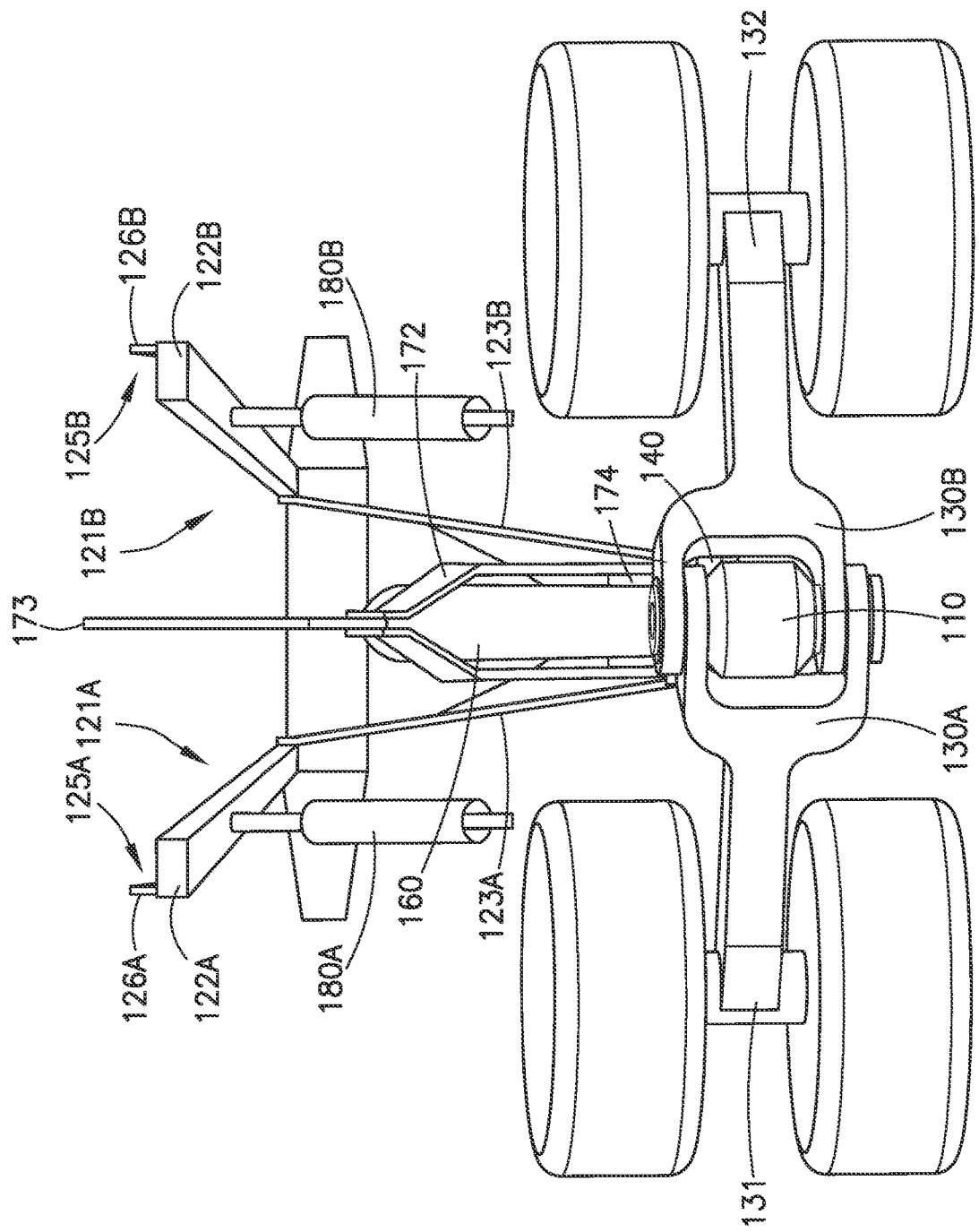
Figure 18D:
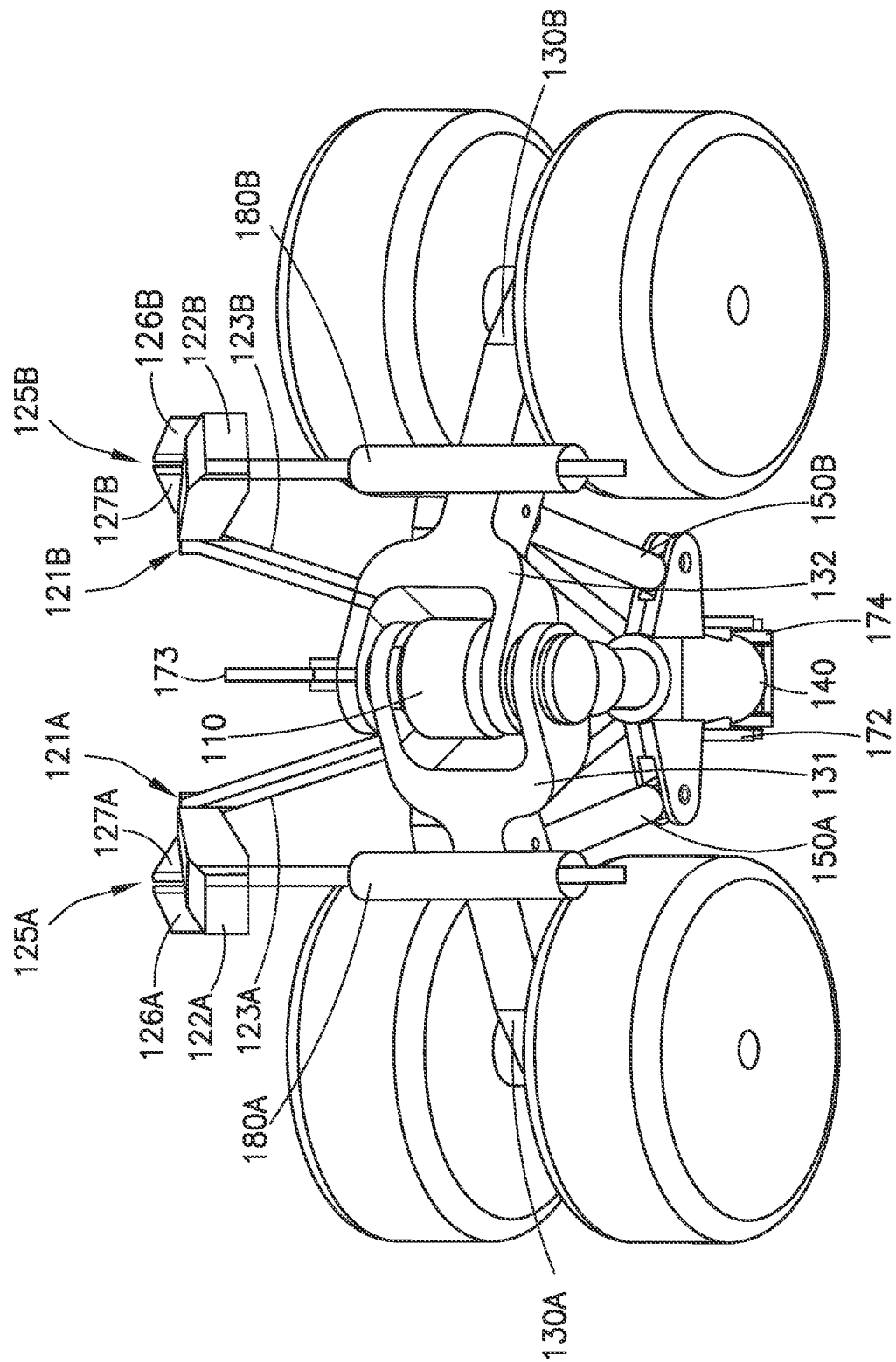
Figure 19:
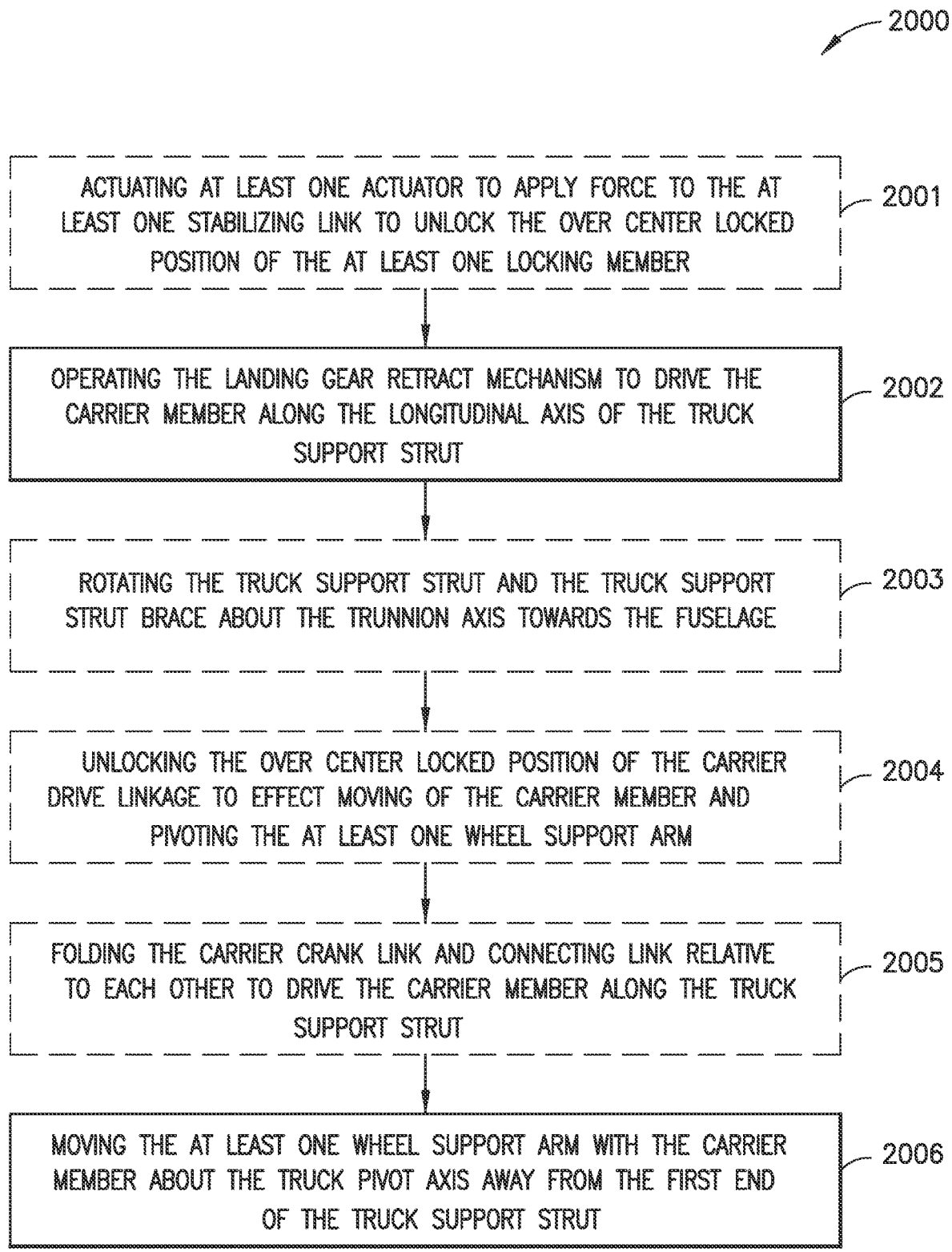
Figure 20:
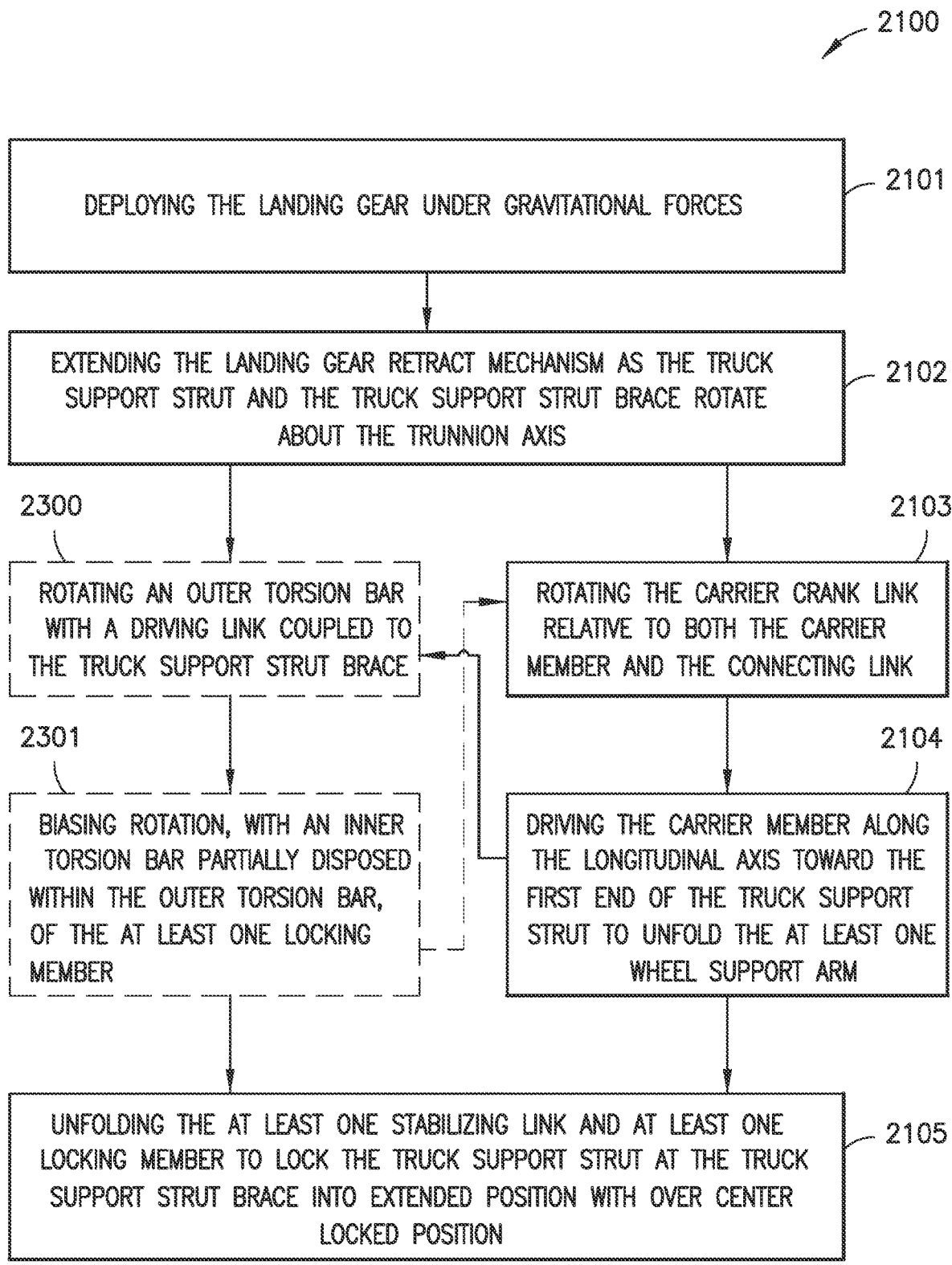
Figure 21:
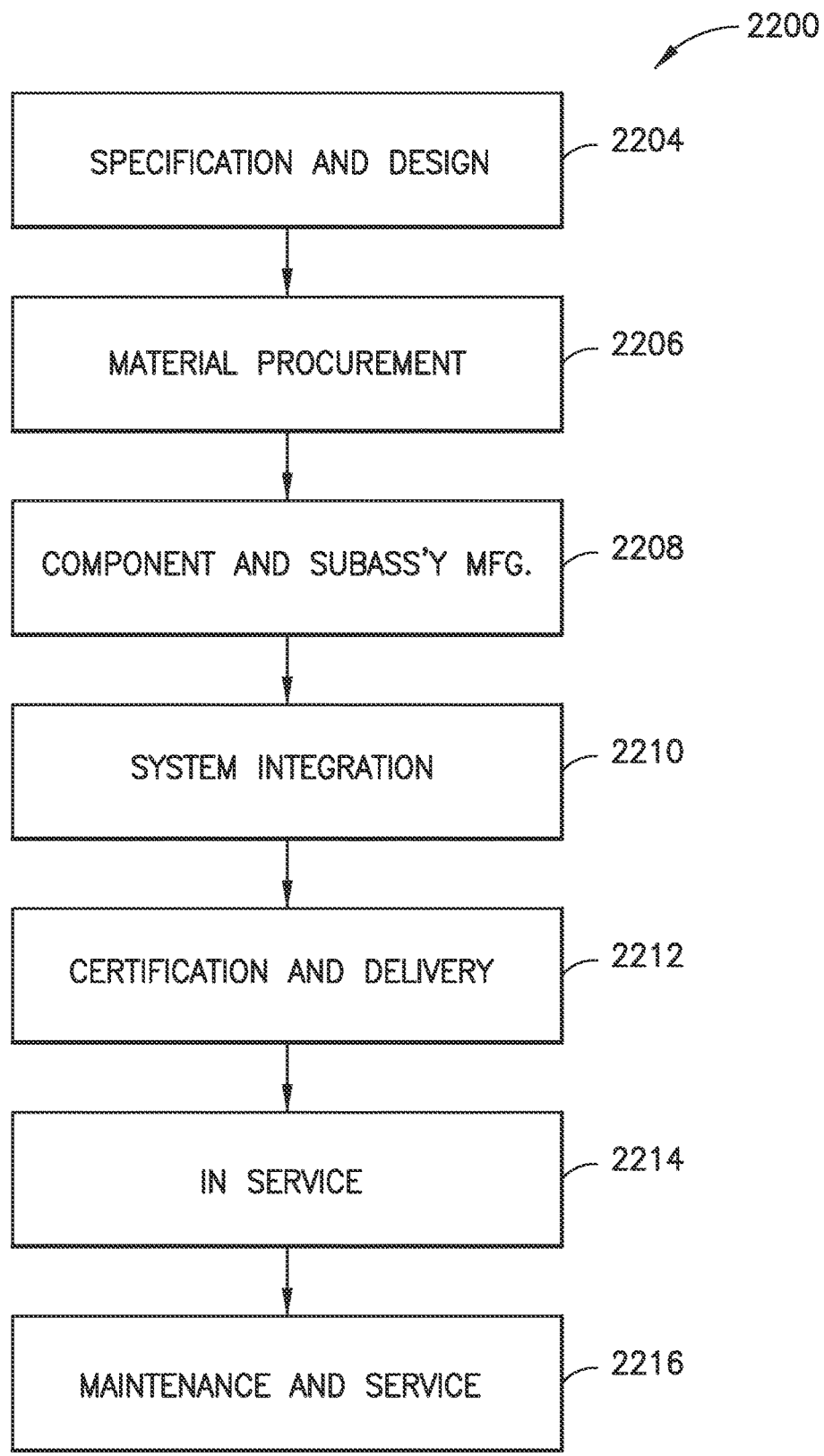

Having thus described examples of the present disclosure in general terms, reference will now be made to the accompanying drawings, which are not necessarily drawn to scale, and wherein like references characters designate the same or similar parts throughout the several views, and wherein:

FIGS. 1A-1C are schematic illustrations respectively of a top, side, and front of an aircraft in accordance with one or more aspects of the present disclosure;

FIG. 2 is a schematic front view illustration of a landing gear in an extended configuration in accordance with one or more aspects of the present disclosure;

FIGS. 3A-3D are schematic perspective view illustrations of a retraction sequence of the landing gear of FIG. 2 in accordance with one or more aspects of the present disclosure;

FIG. 4 is a schematic front view illustration of the landing gear of FIG. 2 in a retracted configuration in accordance with one or more aspects of the present disclosure;

FIG. 5 is a schematic front view illustration of the landing gear of FIG. 2 in accordance with one or more aspects of the present disclosure;

FIG. 6 is a schematic side view illustration of the landing gear of FIG. 5 in accordance with one or more aspects of the present disclosure;

FIG. 7 is a schematic side view illustration of the landing gear of FIG. 2 in accordance with one or more aspects of the present disclosure;

FIGS. 8A-8B are each a schematic bottom view illustration of a portion of the landing gear of FIG. 2 in accordance with one or more aspects of the present disclosure;

FIG. 9 is a schematic front view illustration of a landing gear in an extended configuration in accordance with one or more aspects of the present disclosure;

FIG. 10 is a schematic front view illustration of the landing gear of FIG. 9 in a retracted configuration in accordance with one or more aspects of the present disclosure;

FIG. 11 is a schematic side view illustration of the landing gear of FIG. 9 in accordance with one or more aspects of the present disclosure;

FIG. 12 is a schematic top view of the landing gear of FIG. 9 in accordance with one or more aspects of the present disclosure;

FIG. 13 is a schematic front view illustration of a portion of the landing gear of FIG. 9 in accordance with one or more aspects of the present disclosure;

FIG. 14 is a schematic front view illustration of a portion of the landing gear of FIG. 9 in accordance with one or more aspects of the present disclosure;

FIG. 15 is a schematic front view illustration of a portion of the landing gear of FIG. 9 in a partially extended configuration in accordance with one or more aspects of the present disclosure;

FIG. 16 is a schematic front view illustration of the landing gear of FIG. 9 in a retracted configuration in accordance with one or more aspects of the present disclosure;

FIGS. 17A-17D are schematic front view illustrations of a retraction sequence of FIGS. 17A-17D of the landing gear of FIG. 2 in accordance with one or more aspects of the present disclosure;

FIGS. 18A-18D are schematic side view illustrations of a retraction sequence of FIGS. 17A-17D of the landing gear of FIG. 2 in accordance with one or more aspects of the present disclosure;

FIG. 19 is a flow chart of a method of retraction of the landing gear of FIG. 2 in accordance with one or more aspects of the present disclosure;

FIG. 20 is a flow chart of a method of extension of the landing gear of FIG. 2 in accordance with one or more aspects of the present disclosure; and FIG. 21 is a block diagram of aircraft production and service methodology.

DETAILED DESCRIPTION

Referring to FIGS. 1A-1C, 2, and 9, an exemplary landing gear 100, 100' incorporating aspects of the present disclosure is illustrated. The embodiments described herein may provide a landing gear 100, 100' which folds upon itself when retracted into a wheel well of an aircraft 1000 so that the landing gear 100, 100' can be stowed within a fuselage 1001 of the aircraft 1000. Stowage of the landing gear 100, 100' within the fuselage 1001 may eliminate the yehudi, reduce the weight of the aircraft, and increase fuel efficiency and aerodynamics of the aircraft. Stowage of the landing gear 100, 100' within the fuselage 1001, independent of the yehudi, also provides for locating the landing gear 100, 100' aft of the wings 1002 which may increase the angle of attack (3 on takeoff and landing as well as streamline the fuselage 1001 and increase performance (e.g., reduce drag, increase lift, etc.) of the wings 1002. When extended, the landing gear 100, 100' provides for increased ground clearance so that larger more efficient engines can be fitted of the aircraft 1000.

Illustrative, non-exhaustive examples, which may or may not be claimed, of the subject matter according to the present disclosure are provided below.

Still referring to FIGS. 1A-1C, 2, and 9, as described herein, the landing gear 100, 100' includes a landing gear retract mechanism 120, 120' that is configured to shrink the landing gear 100, 100' (e.g., fold the landing gear upon itself) so that the landing gear 100, 100' is retracted for stowage into an area of the fuselage 1001 of the aircraft 1000 that is distinct from the wings 1002 of the aircraft 1000 (i.e., the location of the landing gear 100, 100' along a length of the fuselage 1001 is divorced from the wings 1002).

Figure 3A:
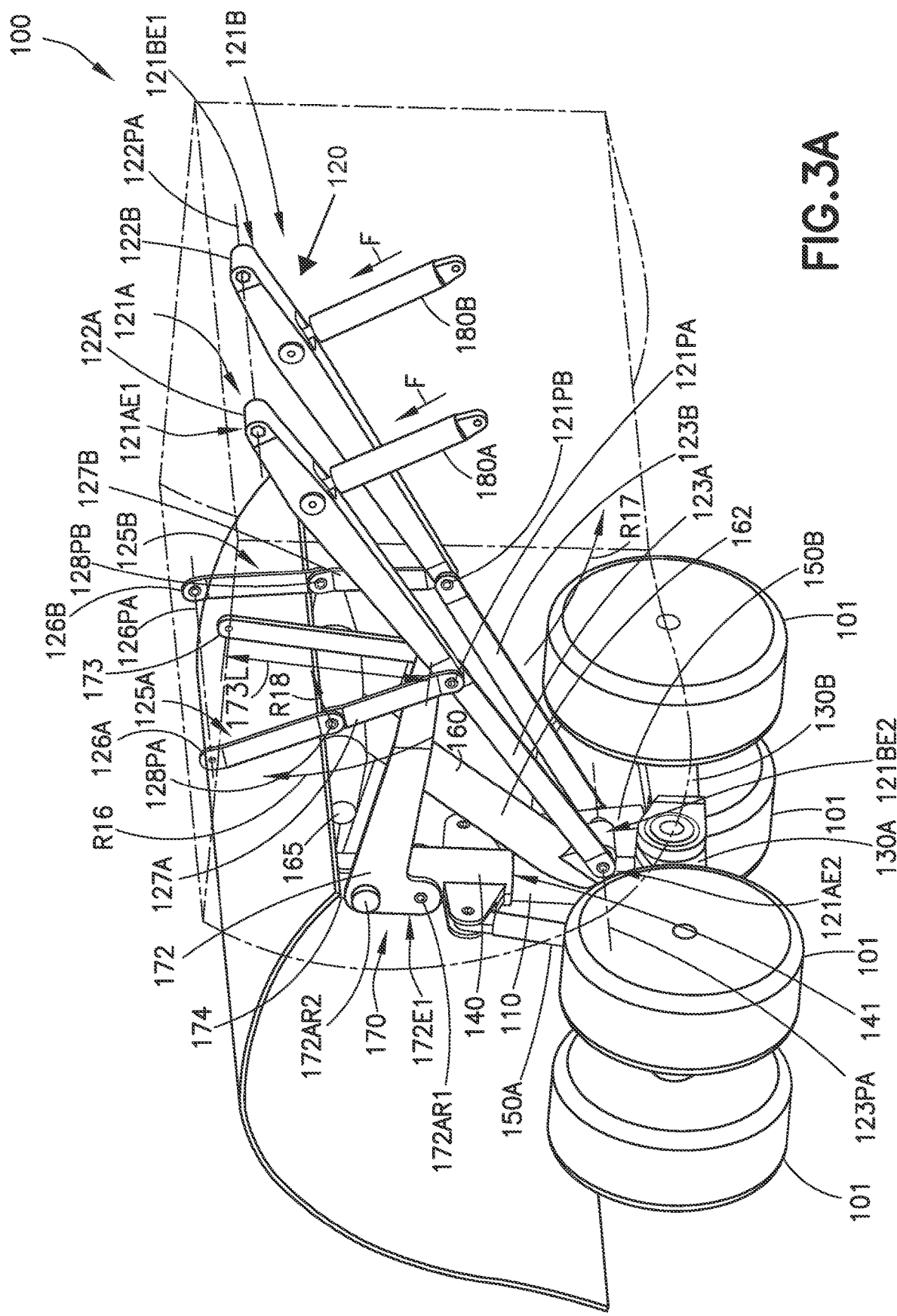
Figure 3C:
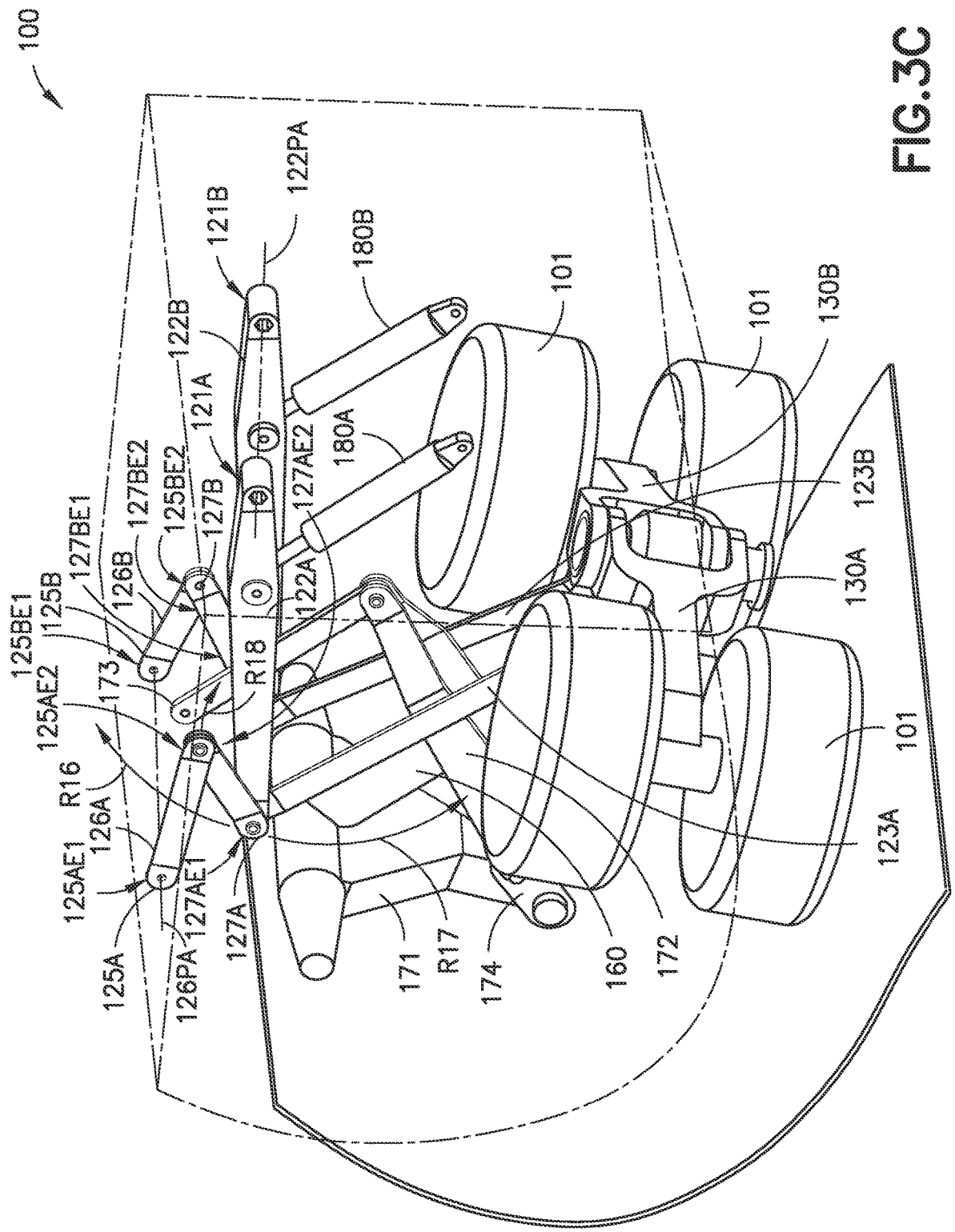

The configuration of the landing gear retract mechanism 120, 120' described herein causes a portion of the landing gear 100, 100' to extend along a lateral side of the fuselage 1001 so as to be disposed entirely beyond a lateral width 1001LW of the fuselage 1001 when the landing gear 100, 100' is extended. The landing gear 100, 100' in accordance with the aspects of the present disclosure provides for coupling the landing gear to a frame 1000F of the aircraft 1000 with less complexity when compared to other, conventional landing gear (such as those coupled to wing structure of the aircraft). For example, the landing gear retract mechanism 120 mechanically shrinks (e.g., folds) the landing gear 100 passively upon actuation of, e.g., a landing gear actuator 180A, 180B, 180' (FIGS. 3A and 10).

While the landing gear 100, 100' described herein is described with respect to a commercial airliner, referred to herein as the aircraft 1000, having a wing root 1003 at, or adjacent, a bottom or belly of the aircraft 1000, in other aspects the aircraft may be any suitable fixed wing or rotary wing aircraft, spacecraft, or any other vehicle that uses retractable landing gear. In one aspect, the aircraft 1000 is a narrow body single aisle aircraft or twin aisle aircraft having 6 or less seats abreast. In other aspects, the aircraft is a wide body multiple aisle aircraft having 7 or more seats abreast. The aircraft 1000 includes the frame 1000F which forms the fuselage 1001. The fuselage 1001 has a longitudinal length 1001LL and a lateral width 1001LW corresponding to one of the narrow body or wide body configurations noted above. The aircraft 1000 further includes wings 1002 coupled to the frame 1000F. In one aspect, the wings 1002 have respective wing roots 1003, each wing 1002 being coupled to the fuselage 1001 at the respective wing root 1003. The aircraft 1000 also includes the landing gear 100, 100' coupled to the frame 1000F for stowage within the fuselage 1001. In one aspect, the landing gear 100, 100' is described herein as being positioned, coupled to the frame 1000F, aft of the wings 1002; however, the aspects of the present disclosure provide for placement of the landing gear 100, 100' anywhere along the length 1001LL (e.g., fore, aft, and/or beneath the wings 1002).

In accordance with the aspects of the present disclosure the landing gear 100, 100' is stowed within a portion of the fuselage 1001 that is separate and distinct from the wing root 1003. In one aspect, the landing gear 100, 100' is coupled to the frame 1000F independent of any structure of the wings 1002. For example, the landing gear 100, 100' is coupled to the frame 1000F independent of any structure that couples the wings 1002 to the frame 1000F. Further, the landing gear 100, 100' is longitudinally spaced apart from the wings 1002, and when the landing gear 100, 100' is deployed, at least a portion of the landing gear 100, 100' extends beyond the lateral width 1001LW of the fuselage 1001. It is noted that the aspects of the present disclosure may also be incorporated or adapted for use with any suitable landing gear, such as nose landing gear 100N located towards a longitudinal front of the aircraft 1000.

Referring now to FIGS. 2-7, in one aspect, the landing gear 100 includes a truck support strut 110, a truck support strut brace 160, the landing gear retract mechanism 120, at least one wheel support arm 130A, 130B, a carrier member 140, and at least one shock absorber 150A, 150B. In one aspect, the landing gear 100 further includes at least one actuator 180A, 180B, and an over center actuation mechanism 190 (FIGS. 14-16).

The truck support strut 110 includes a first end 110E1 and a second end 110E2 separated by a longitudinal axis 110LA (FIG. 5). The truck support strut brace 160 includes a first end 160E1 and a second end 160E2. In one aspect, the second end 110E2 of the truck support strut 110 is non-rotatably coupled to the truck support strut brace 160 at, or adjacent to, the second end 160E2 of the truck support strut brace 160. The first end 160E1 of the truck support strut brace 160 forms a landing gear trunnion 165 and is rotatably coupled to the frame 1000F of the aircraft 1000 about the trunnion axis 1000TA, effectively coupling the truck support strut 110 to the frame 1000F. The truck support strut brace 160 is rotatably coupled to the frame 1000F about a trunnion axis 1000TA, such that the truck support strut 110 and the truck support strut brace 160 rotate about the trunnion axis 1000TA as a unit in direction R1. In one aspect, the truck support strut brace 160 is a single straight, rigid member 162 (FIG. 3). In another aspect, the truck support strut brace 160 includes at least two rigid members 163, 164 forming, for example, with the landing gear trunnion 165, an "A-frame" such as that described herein with respect to FIG. 11 to provide stability and rigidity to the landing gear 100. It should be noted that the truck support strut brace 160 may be any suitable member configured to couple the truck support strut 110 to the frame 1000F of the aircraft 1000. In one aspect, the truck support strut brace 160 further includes a crank arm 161 (FIGS. 5, 10, and 13) that rotates about the trunnion axis 1000TA as will be further described below.

The at least one wheel support arm 130A, 130B is rotatably coupled to the truck support strut 110 at, or adjacent, the second end 110E2 of the truck support strut 110 about truck pivot axis 130PA. In one aspect, as seen best in FIG. 6, the at least one wheel support arm 130A, 130B includes at least one of a leading wheel support arm 131 and a trailing wheel support arm 132, each having at least one wheel pivot axis 131PA, 132PA. Each of the leading and trailing wheel support arms 131, 132 have a first end 131E1, 132E1 and a second end 131E2, 132E2 spaced apart from one another. In one aspect, the first end 131E1, 132E1 of a respective one of the leading and trailing wheel support arms 131, 132 is rotatably coupled to the truck support strut 110 at the truck pivot axis 130PA. The leading and trailing wheel support arms 131, 132 coupled to the truck pivot axis 130PA are configured to rotate/pivot about the truck pivot axis 130PA. Generally, each at least one wheel support arm 130A, 130B is a rigid member (e.g., unjointed between the respective first ends 131E1, 132E1 and second ends 131E2, 132E2) that is configured to rotate about the truck pivot axis 130PA during retraction and extension of the landing gear 100 and during shock absorption. For example, during extension, the leading wheel support arm 131 is configured to rotate about the truck pivot axis 130PA in direction 999E1 (FIG. 6) away from the first end 110E1 of the truck support strut 110. During retraction, the leading wheel support arm 131 is configured to rotate about the truck pivot axis 130PA in direction 999R1 (FIG. 6) towards the first end 110E1 of the truck support strut 110. Similarly, the trailing wheel support arm 132 is configured to rotate about the truck pivot axis 130PA in direction 999E2 (FIG. 6) away from the first end 110E1 of the truck support strut 110 during extension. During retraction, the trailing wheel support arm 132 is configured to rotate about the truck pivot axis 130PA in direction 999R2 (FIG. 6) towards the first end 110E1 of the truck support strut 110.

Referring now to FIGS. 6, 7, 8A, and 8B, in one aspect, the at least one wheel pivot axis 131PA, 132PA is disposed at, or adjacent to, the second end 131E2, 132E2 of the respective one of the leading and trailing wheel support arms 131, 132. In one aspect, at least one wheel 101 is rotatably coupled to the second end 131E2, 132E2 of each respective one of the leading and trailing wheel support arms 131, 132 about the respective wheel pivot axis 131PA, 132PA, such that the at least one wheel 101 rotates about the respective wheel pivot axis 131PA, 132PA. As seen best in FIGS. 8A and 8B, in one aspect, the landing gear may have four wheels 101, while in other aspects, the landing gear may have two or any suitable number of wheels 101 such as one, six, eight, etc. In one aspect, the at least one wheel support arm 130A, 130B may be a substantially straight, rigid member, while in other aspects, the at least one wheel support arm 130A, 130B may have a forked configuration (FIG. 8B) or any other suitable configuration to support the wheels 101.

Referring again to FIGS. 2-7, in one aspect, the carrier member 140 is movably coupled to the truck support strut 110 so that the truck support strut 110 guides sliding movement of the carrier member 140 along the longitudinal axis 110LA of the truck support strut 110. As seen best in FIG. 6, the carrier member 140 includes a bore 141, drive attachment points 142, 143 (FIGS. 2 and 6), and shock absorber attachment points 144, 145 (FIGS. 2 and 6). The carrier member 140 is configured to slide, linearly, along the longitudinal axis 110LA of the truck support strut 110 between the first end 110E1 and the second end 110E2 of the truck support strut 110 as the landing gear 100 extends and retracts. For example, the bore 141 of the carrier member 140 extends along a portion of the longitudinal axis 110LA of the truck support strut 110 and the truck support strut 110 is disposed at least partially within the bore 141. Any suitable bearing or bearing surface coatings may be disposed between or on the bore 141 and the truck support strut 110 to provide lubricity for and wear protection against the sliding movement of the carrier member 140 relative to the truck support strut 110. As will be further described herein, the carrier member 140 is further coupled to the landing gear retract mechanism 120 at the drive attachment points 142, 143 for the landing gear retract mechanism 120 to drive the carrier member 140 along the longitudinal axis 110LA during extension and retraction of the landing gear 100.

In one aspect, each of the at least one shock absorber 150A, 150B is coupled to both of a respective one of the at least one wheel support arm 130A, 130B and the carrier member 140. The first end 150AE1, 150BE1 (FIG. 6) of the at least one shock absorber 150A, 150B is pivotally coupled to the shock absorber attachment points 144, 145 about pivot axis 140SA1, 140SA2 (FIG. 6) and the second end 150AE2, 150BE2 is pivotally coupled to the at least one wheel support arm 130A, 130B about pivot axis 130SA1, 130SA2 (FIG. 6). In one aspect, the at least one shock absorber 150A, 150B includes an outer cylinder 151 and an inner cylinder 152 (FIG. 6), with the inner cylinder 152 being configured to reciprocate within the outer cylinder 151. In one aspect, the at least one shock absorber 150A, 150B is an oleo or air/oil shock absorber configured to absorb and dissipate shock loads during landing, take-off, and taxi of the aircraft 1000.

The at least one shock absorber 150A, 150B is further configured to effect rotation of the at least one wheel support arm 130A, 130B about the truck pivot axis 130PA relative to the truck support strut 110 (i.e., effects rotation of the leading and trailing wheel support arms 131, 132 towards or away from the first end 110E1 of the truck support strut 110) as the landing gear 100 is extended and retracted, and during ground operations of the aircraft 1000 as described herein. With the landing gear in the extended position, the at least one shock absorber 150A, 150B rotates the leading and trailing wheel support arms 131, 132 towards or away from the first end 110E1 of the truck support strut 110 to increase and decrease a length 100L of the landing gear 100 (i.e., a length of the landing gear 100 in a 1G loaded configuration with the wheels 101 on the ground supporting the full weight of the aircraft 1000). For example, in one aspect, the at least one shock absorber 150A, 150B is configured such that during take-off of the aircraft 1000, the landing gear 100 increases by a length 100L1 (extends), which may be about 21 inches or more or less than about 21 inches from the 1G loaded configuration 100LDC, to, e.g., generate a greater angle of rotation/attack β (FIG. 1B). The extension of the at least one shock absorber 150A, 150B from the 1G loaded configuration 100LDC FIGS. 6 and 7) may be about 21 inches or more or less than about 21 inches. The at least one shock absorber 150A, 150B may also be compressed any suitable amount from the 1G loaded configuration 100LDC, such as, for example, about 4 inches or more or less than about 4 inches.

Referring still to FIGS. 2-7, the landing gear retract mechanism 120 of landing gear 100 includes at least one stabilizing link 121A, 121B, at least one locking member 125A, 125B, and a carrier drive linkage 170, and is coupled to both the truck support strut 110 and the frame 1000F of the aircraft 1000. In one aspect, the landing gear retract mechanism 120 is configured to couple the truck support strut 110 to the frame 1000F of the aircraft 1000, such that the first end 110E1 of the truck support strut 110 is suspended from the frame 1000F by the landing gear retract mechanism 120. As described below, links of the landing gear retract mechanism 120 hold and orient the truck support strut 110 relative to the frame 1000F in both the extended and retracted configurations.

The at least one stabilizing link 121A, 121B is coupled both to the frame 1000F and to the truck support strut 110. The first end 121AE1, 121BE1 of the at least one stabilizing link 121A, 121B is rotatably coupled to the frame 1000F of the aircraft 1000 and the second end 121AE2, 121BE2 of the at least one stabilizing link 121A, 121B is rotatably coupled at, or adjacent to, the second end 110E2 of the truck support strut 110. The at least one stabilizing link 121A, 121B is an articulated link including a first link member 122A, 122B and a second link member 123A, 123B. A first end 122AE1, 122BE1 (FIG. 3B) of the first link member 122A, 122B and a first end 123AE1, 123BE1 (FIG. 3B) of the second link member 123A, 123B are rotatably fixed to a respective one of the frame 1000F of the aircraft 1000 and the second end 110E2 of the truck support strut 110. A second end 122AE2, 122BE2 of the first link member 122A, 122B is rotatably coupled to a second end 123AE2, 122BE2 of the second link member 123A, 123B at a stabilizing link pivot axis 121PA, 121PB. The first link member 122A, 122B and the second link member 123A, 123B are rotatably coupled so as to fold/unfold relative to each other about the stabilizing link pivot axis 121PA, 121PB. For example, as will be described further below, the actuator 180A, 180B applies a force F to the first link member 122A, 122B. The first end 122AE1, 122BE1 of the first link member 122A, 122B being rotatably fixed to the frame 1000F of the aircraft 1000 causes the stabilizing link pivot axis 121PA, 121PB (FIG. 3A), located at the second ends 122AE2, 122BE2 and 123AE2, 123BE2 of the first and second link members 122A, 122B and 123A, 123B, to pivot about pivot axis 122PA in direction R16 and the second link member 123A, 123B to fold relative to the first link member 122A, 122B in rotation direction R6 (FIG. 2). As the stabilizing link pivot axis 121PA, 121PB pivots about the pivot axis 122PA in direction R16 and the second link member 123A, 123B folds relative to the first link member 122A, 122B in rotation direction R6, the first end 123AE1, 123BE1 of the second link member 123A, 123B, rotatably fixed to the truck support strut 110, forces the truck support strut 110 to be rotated about the trunnion axis 1000TA in direction R1B (FIG. 4). It is noted that during retraction, the first and second link members 122A, 122B, 123A, 123B operate, under gravity, substantially opposite to that described above with respect to extension, with the stabilizing link pivot axis 121PA, 121PB pivoting about the pivot axis 122PA in direction R17 and the second link member 123A, 123B unfolding relative to the first link member 122A, 122B in rotation direction R2.

The at least one locking member 125A, 125B is coupled to both the frame 1000F of the aircraft 1000 and a respective stabilizing link 121A, 121B. The at least one locking member 125A, 125B is coupled to the frame 1000F of the aircraft 1000 at a separate and distinct location than the at least one stabilizing link 121A, 121B such that the at least one locking member 125A, 125B is angled θ (FIG. 2) relative to the respective stabilizing link 121A, 121B to mechanically lock rotation of the first link member 122A, 122B and the second link member 123A, 123B of the at least one stabilizing link 121A, 121B. In one aspect, the at least one locking member 125A, 125B is coupled to one of the first link member 122A, 122B and the second link member 123A, 123B proximate the stabilizing link pivot axis 121PA, 121PB. The at least one locking member 125A, 125B is articulated and includes a first locking link 126A, 126B and a second locking link 127A, 127B. A first end 126AE1, 126BE1 (FIG. 3C) of the first locking link 126A, 126B is rotatably fixed to the frame 1000F of the aircraft at pivot axis 126PA. A second end 126AE2, 126BE2 (FIG. 3C) of the first locking link 126A, 126B is rotatably coupled to a second end 127AE2, 127BE2 (FIG. 3C) of the second locking link 127A, 127B at a lock link pivot axis 128PA, 128PB. A first end 127AE1, 127BE1 (FIG. 3C) of the second locking link 127A, 127B is rotatably coupled to the at least one stabilizing link 121A, 121B proximate the stabilizing link pivot axis 121PA, 121PB. The first locking link 126A, 126B and the second locking link 127A, 127B are rotatably coupled so as to fold/unfold relative to each other about the lock link pivot axis 128PA, 128PB. For example, as will be further described below, the actuator 180A, 180B applying a force F to the at least one stabilizing link 121A, 121B causes rotation of the stabilizing link pivot axis 121PA, 121PB about pivot axis 122PA. The first end 127AE1, 127BE1 of the second locking link 127A, 127B being rotatably coupled proximate the stabilizing link pivot axis 121PA, 121PB and the first locking link 126A, 126B being rotatably fixed to the frame 1000F forces the lock link pivot axis 128PA, 128PB in direction R18 (FIGS. 3A-3C)) when the stabilizing link pivot axis 121PA, 121PB rotates about pivot axis 122PA. As such, the second locking link 127A, 127B folds relative to the first locking link 126A, 126B in rotation direction R7 (FIG. 2).

It is noted that during retraction, the first and second locking links 126A, 127A and 126B, 127B operate, under gravity, substantially opposite to that described above with respect to extension, with the stabilizing link pivot axis 121PA, 121PB pivoting about the pivot axis 122PA in direction R17 and the second locking link 127A, 127B unfolding relative to the first locking link 126A, 126B in rotation direction R3. The second locking link 127A, 127B rotating relative to the first locking link 126A, 126B in rotation direction R3 extends the at least one locking member 125A, 125B to an over center locking position and mechanically locks rotation of the first link member 122A, 122B and the second link member 123A, 123B of the at least one stabilizing link 121A, 121B and thus maintains the landing gear 100 in the extended position.

Still referring to FIGS. 2-7, in one aspect, the carrier drive linkage 170 is coupled to each of the carrier member 140, the truck support strut 110, and the frame 1000F of the aircraft 1000. As noted above, the landing gear retract mechanism 120, and more specifically the carrier drive linkage 170, is configured to drive the carrier member 140 so that the carrier member 140 slides, linearly, along the longitudinal axis 110LA of the truck support strut 110. In one aspect, the carrier drive linkage 170 includes a lateral stabilizing link 171, at least one carrier crank link 172, at least one pivot link 173, and at least one connecting link 174.

In one aspect, the lateral stabilizing link 171 is coupled to both the truck support strut brace 160 and the first end 110E1 of the truck support strut 110. The lateral stabilizing link 171 is coupled to the truck support strut brace 160 adjacent the trunnion axis 1000TA. For example, in one aspect, the lateral stabilizing link 171 is pivotably coupled to the crank arm 161 (FIG. 5) of the truck support strut brace 160, or may be non-rotatably coupled to the truck support strut brace 160 (FIG. 2). The lateral stabilizing link 171 is configured to resist lateral displacement of the first end 110E1 of the truck support strut 110.

In one aspect, the carrier crank link 172 may straddle the truck support strut brace 160 (FIGS. 2 and 3) as a two piece or one piece member (FIGS. 3 and 7), while in other aspects, the carrier crank link 172 may comprise two distinct links 172A, 172B (FIG. 6) that extend on opposite sides of the truck support strut brace 160. Each carrier crank link 172 includes a carrier crank link first end 172E1 and a carrier crank link second end 172E2. The carrier crank link first end 172E1 is configured to be rotatably coupled to the drive attachment points 142, 143 of the carrier member 140 at a carrier crank link first axis of rotation 172AR1. The carrier crank link 172 and the carrier member 140 are configured to so as to fold/unfold relative to each other about the carrier crank link first axis of rotation 172AR1. For example, as the truck support strut brace 160 rotates about the trunnion axis 1000TA in direction R1A (FIG. 4) to extend the landing gear 100, the carrier crank link 172 rotates relative to the carrier member 140 in rotation direction R4 and drives the carrier member 140 along the truck support strut 110. Similarly, as the truck support strut brace 160 rotates about the trunnion axis 1000TA in direction R1B to retract the landing gear 100, the carrier crank link 172 rotates relative to the carrier member 140 in rotation direction R8 (FIG. 2) and drives (with articulation of the at least one connecting link 17, as described herein) the carrier member 140 from the second end 110E2 towards the first end 110E1 of the truck support strut 110.

The at least one pivot link 173 is configured to couple to the carrier crank link second end 172E2 such that the pivot link 173 couples the carrier crank link 172 to the frame 1000F at a pivot link pivot axis 173PA FIGS. 2 and 5). In one aspect, the at least one pivot link 173 is a single rigid member which has a fixed length 173L (FIG. 2) and couples to the second end 172E2 of the unity constructed carrier crank link 172 (FIGS. 2 and 3). In other aspects, the at least one pivot link 173 may be two rigid members (i.e., pivot links 173A, 173B (FIG. 6)) each having a fixed length 173L and being coupled to a respective one of the carrier crank links 172A, 172B (i.e., when the carrier crank link 172 comprises two distinct links). The at least one pivot link 173 is configured such that as the landing gear 100 extends and retracts, the pivot link 173 coupled to the second end 172E2 of the carrier crank link 172 causes the second end 172E2 to pivot about the pivot link pivot axis 173PA in direction R15 (FIG. 2). As the second end 172E2 of the carrier crank link 172 is forced about the pivot link pivot axis 173PA by the pivot link 173, the carrier crank link 172 locks/unlocks an over center locked position of the carrier drive linkage 170 as described herein.

Still referring to FIGS. 2-7, in one aspect, each of the at least one connecting link 174 includes a first end 174E1 and a second end 174E2 (FIG. 5) and is configured to rotatably couple to both the carrier crank link 172 and the lateral stabilizing link 171. The first end 174E1 of the connecting link 174 is rotatably coupled to the carrier crank link first end 172E1 of the carrier crank link 172 at a carrier crank link second axis of rotation 172AR2 which is distinct from and disposed adjacent to the carrier crank link first axis of rotation 172AR1. The second end 174E2 of the connecting link 174 is rotatably fixed to one or more of the lateral stabilizing link 171 and the first end 110E1 of the truck support strut 110 about a connecting link axis of rotation 174AR (FIGS. 2 and 5).

The connecting link 174 is configured to rotate relative to the carrier crank link 172 in rotation directions R5 and R9. For example, as the truck support strut brace 160 rotates about the trunnion axis 1000TA to extend the landing gear 100, the connecting link 174 rotates relative to the carrier crank link 172 so as to unfold/fold relative to each other about the carrier crank link second axis of rotation 172AR2. As described herein, rotatably fixing the second end 174E2 of the at least one connecting link 174 to the lateral stabilizing link 171 and/or the truck support strut 110 at the connecting link axis of rotation 174AR and the rotation of the connecting link 174 about the connecting link axis of rotation 174AR caused by the rotation of the carrier crank link 172, drives the carrier member 140 along the longitudinal axis 110LA. As such, the leading and trailing wheel support arms 131, 132 are rotated away from the first end 110E1 of the truck support strut 110 when the landing gear 100 is extended. The connecting link 174 and the carrier crank link 172 unfolding relative to each other about the carrier crank link second axis of rotation 172AR2 further causes an over center mechanical locking (at carrier crank link second axis of rotation 172AR2) of the carrier drive linkage 170 so as to lock the carrier member 140 and the leading and trailing wheel support arms 131, 132 in an extended position.

For retraction, the connecting link 174 rotates relative to the carrier crank link 172 in direction R9 so that the connecting link 174 and the carrier crank link 172 fold relative to each other about the carrier crank link second axis of rotation 172AR2. Substantially similar to but opposite extension, rotatably fixing the second end 174E2 of the at least one connecting link 174 to the lateral stabilizing link 171 and/or the truck support strut 110 at the connecting link axis of rotation 174AR and the rotation of the connecting link 174 about the connecting link axis of rotation 174AR caused by the rotation of the carrier crank link 172, drives the carrier member 140 along the longitudinal axis 110LA to rotate the leading and trailing wheel support arms 131, 132 toward the first end 110E1 of the truck support strut 110 when the landing gear 100 is retracted.

In another aspect, referring to FIGS. 9-12 the landing gear 100' is substantially similar to the landing gear 100 described herein with respect to FIGS. 1-7. The landing gear 100' includes the truck support strut 110, the truck support strut brace 160, a landing gear retract mechanism 120', at least one wheel support arm 130A, 130B, a carrier member 140, and at least one shock absorber 150A, 150B.

The landing gear retract mechanism 120' includes a carrier drive linkage 170' having an articulated lateral stabilizing link 171', the at least one carrier crank link 172, and the at least one pivot link 173. Here, the at least one carrier crank link 172 is illustrated, for exemplary purposes, as the two distinct links 172A, 172B, and the at least one pivot link 173 is illustrated as the two links 173A, 173B.

In this aspect, in place of the connecting link 174, the landing gear 100' includes the articulated lateral stabilizing link 171'. The articulated lateral stabilizing link 171' includes a first lateral stabilizing link member 175 having a first end 175E1 and a second end 175E2, the first end 175E1 being rotatably coupled to the truck support strut brace 160 adjacent the trunnion axis 1000TA. The articulated lateral stabilizing link 171' further includes a second lateral stabilizing link member 176 having a third end 176E1 rotatably coupled to the second end 175E2 of the first lateral stabilizing link member 175 about pivot axis 171PA and a fourth end 176E2 rotatably fixed to the first end 110E1 of the truck support strut 110 about a strut pivot axis 176SPA. The fourth end 176E2 includes the strut pivot axis 176SPA and a crank pivot axis 176CPA disposed adjacent one another so that the second lateral stabilizing link member 176 forms a substantially "L" shaped link where the strut pivot axis 176SPA forms a vertex of an angle γ between axis 171PA and the crank pivot axis 176CPA. The second lateral stabilizing link member 176 is rotatably coupled to the carrier crank link 172A, 172B at the crank pivot axis 176CPA. Substantially similar to the connecting link 174 of the landing gear 100, the second lateral stabilizing link member 176 is configured to rotate relative to the carrier crank link 172A, 172B in rotation directions R10, R11. For example, as the truck support strut brace 160 rotates about the trunnion axis 1000TA to extend the landing gear 100', the second lateral stabilizing link member 176 rotates about axis 176CPA in direction R10 relative to the carrier crank link 172A, 172B so as to unfold relative to each other about the crank pivot axis 176CPA. As described herein, rotatably fixing the second lateral stabilizing link member 176 to the truck support strut 110 at the strut pivot axis 176SPA and rotation of the second lateral stabilizing link member 176 about the strut pivot axis 176SPA cause by rotation of the carrier crank link 172A, 172B', drives the carrier member 140 along the longitudinal axis 110LA. As such, the at least one wheel support arm 130A, 130B is rotated away from the first end 110E1 of the truck support strut 110. The second lateral stabilizing link member 176 and the carrier crank link 172A, 172B unfolding relative to each other about the crank pivot axis 176CPA further causes a mechanical locking (at the crank pivot axis 176CPA) of the carrier drive linkage 170' so as to lock the carrier member 140 and the at least one wheel support arm 130A, 130B in an extended position.

For retraction, the second lateral stabilizing link member 176 rotates about axis 176CPA in direction R11 relative to the carrier crank link 172A, 172B so that the second lateral stabilizing link member 176 and the carrier crank link 172A, 172B fold relative to each other about the crank pivot axis 176CPA. Substantially similar to extension, rotatably fixing the second lateral stabilizing link member 176 to the truck support strut 110 at the strut pivot axis 176SPA and the rotation of the second lateral stabilizing link member 176 about the strut pivot axis 176SPA caused by the rotation of the carrier crank link 172A, 172B, drives the carrier member 140 along the longitudinal axis 110LA to rotate the at least one wheel support arm 130A, 130B toward the first end 110E1 of the truck support strut 110.

Additionally, the first lateral stabilizing link member 175 and the second lateral stabilizing link member 176 are configured to fold/unfold relative to each other about axis 171PA. The first lateral stabilizing link member 175 and the second lateral stabilizing link member 176 provides for a more compact folding of the landing gear 100' compared to the landing gear 100 described above. For example, when the landing gear 100' is retracted, the second lateral stabilizing link member 176 rotates relative to the first lateral stabilizing link member 175 from an angle Δ1 (FIG. 9) that is substantially about 180 degrees to another angle 42 (FIG. 10) that is less than 180 degrees. The second lateral stabilizing link member 176 rotating relative to the first lateral stabilizing link member 175 to angle 42 cause angle λ between the truck support strut 110 and the truck support strut brace 160 to become smaller (see comparison between landing gear 100 in FIG. 4 and landing gear 100' in FIG. 10). This smaller angle λ provides for the more compact folding of the landing gear 100' into a smaller wheel well than the landing gear 100.

In one aspect, the outer cylinder 151 and the inner cylinder 152 are configured to remain static relative to each other during retraction/extension of the landing gear 100 after take-off or during a landing approach (i.e., the inner cylinder 152 remains partially extended out of the outer cylinder 151 and does not move relative to the outer cylinder 151 while the aircraft, and thus the wheels 101, are off the ground). With the outer cylinder 151 and the inner cylinder 152 in the static configuration as the landing gear 100 extends or retracts, the landing gear 100 is effectively extended or shrunk by driving the carrier member 140 along the longitudinal axis 110LA as described herein. As the carrier member 140 travels along the longitudinal axis 110LA, the outer cylinder 151 and the inner cylinder 152, in the static configuration, travel with the carrier member due to being coupled to the carrier member 140. The travel of the outer cylinder 151 and the inner cylinder 152 in the static configuration effect rotation of the at least one wheel support arm 130A, 130B to extend or shrink the landing gear 100. For example, in one aspect, the landing gear 100 may be extended or shrunk by length 100L2 which may be more or less than about 52 inches as the landing gear retract mechanism 120 retracts the landing gear 100. In another aspect, the landing gear 100 may extend or shrink by any suitable length.

As noted above, in one aspect, the landing gear 100, 100' further includes at least one actuator 180A, 180B, 180'. In one aspect, referring got FIGS. 3 and 7, the at least one actuator 180A, 180B is coupled the at least one stabilizing link 121A, 121B and the frame 1000F, shown with respect to landing gear 100 for exemplary purposes only. For example, actuator 180A is coupled to stabilizing link 121A and actuator 180B is coupled to stabilizing link 121B. The at least one actuator 180A, 180B is configured to drive movement of the at least one stabilizing link 121A, 121B. For example, the at least one actuator 180A, 180B may be actuated to apply a force F to the at least one stabilizing link 121A, 121B as will be further described below. Driving movement of the at least one stabilizing link 121A, 121B effects actuation of the landing gear retract mechanism 120 to retract the landing gear 100 (i.e., actuate the at least one wheel support arm 130A, 130B to rotate towards or away from the first end 110E1 of the truck support strut 110) as will be described herein.

In another aspect, as illustrated in FIGS. 11, 13, and 14, the landing gear 100, 100' includes actuator 180', shown with respect to landing gear 100' for exemplary purposes only. The actuator 180' includes a first end 180E1 and a second end 180E2. The first end 180E1 is coupled to the frame 1000F of the aircraft 1000. The second end 180E2 of the actuator is coupled to both the crank arm 161' and the truck support strut brace 160 via a respective first and second link 181, 182. Here, the actuator 180' is configured to drive movement of the truck support strut brace 160. For example, the first and second links 181, 182 constrain the actuator 180' relative to a second end 161E2 of the crank arm 161 so that the force F is directed alongside the trunnion axis 1000TA to create a moment M on both the crank arm 161 and the second link 182 about axis A10 and cause rotation of the first end 161E1 of the crank arm 161 in direction R19. Driving movement of the truck support strut brace 160 effects actuation of the landing gear retract mechanism 120 to retract the landing gear 100 (i.e., so that the at least one wheel support arm 130A, 130B is actuated to rotate towards or away from the first end 110E1 of the truck support strut 110) as described herein. In one aspect, the actuator 180' may further be configured to effect actuation of the landing gear retract mechanism 120 to at least retract the landing gear 100'. It is noted that although the actuator 180' is described and illustrated with respect to landing gear 100', the actuator 180' may replace or supplement the at least one actuator 180A, 180B of landing gear 100.

Referring now to FIGS. 12 and 14-16, in one aspect, the landing gear 100, 100' further includes an over center actuation mechanism 190 coupled to the at least one locking member 125A (while only one locking member 125A is illustrated, the locking member may have a configuration substantially similar to the configuration described above with respect to, e.g., FIG. 2). The over center actuation mechanism 190 is configured to bias extension of the landing gear 100, 100' so that the landing gear 100, 100' fully extends and is locked (e.g., lock the at least one locking member 125A in the over center locked position) in the extended configuration.

In one aspect, the over center actuation mechanism 190 includes at least one torsion bar 191 coupling the at least one locking member 125A to the frame 1000F. In one aspect, the at least one torsion bar 191 includes an outer torsion bar 192 rotatably coupled to the frame 1000F about a torsion bar pivot axis 191PA. The outer torsion bar 192 is coupled to the truck support strut brace 160 by driving link 195 so that rotation of the truck support strut brace 160 about the trunnion axis 1000TA causes rotation of the outer torsion bar 192 about the torsion bar pivot axis 191PA.

The at least one torsion bar 191 further includes an inner torsion bar 193 disposed at least partially within the outer torsion bar 192. A first end 193E1 of the inner torsion bar 193 is coupled to the outer torsion bar 192 so that at least a portion of the inner torsion bar 193 rotates as a unit with the outer torsion bar 192. The inner torsion bar 193 is non-rotatably coupled to the outer torsion bar 192 by a spline coupling 194 (i.e., the first end 193E1 of the inner torsion bar 193 is inserted into the outer torsion bar 192). A second end 193E2 of the inner torsion bar 193 is coupled to the at least one locking member 125A so that torque applied to the inner torsion bar 193 by the outer torsion bar 192 is transferred to the at least one locking member 125A through the inner torsion bar 193. The torque transferred to the at least one locking member 125A by the inner torsion bar 193 biases the at least one locking member 125A toward the locked position and effects locking of the at least one locking member 125A in the locked position to fully extend the landing gear 100, 100'. For example, in one aspect, the torsion bar is configured so as to bias and lock the at least one locking member 125A in the over center locked position upon passive gravitational extension of the landing gear 100. Again, it is noted that although the over center actuation mechanism 190 is described and illustrated with respect to landing gear 100', the over center actuation mechanism 190 may be utilized or supplement extension/retract of landing gear 100.

When the landing gear 100 is retracted, the truck support strut brace 160 rotates, via a driving link 195 coupling the truck support strut brace 160 to the outer torsion bar 192, the outer torsion bar 192 in a rotation direction R20. Also, when the landing gear 100 is retracted, the at least one locking member 125A is folded so that the outer and inner torsion bars 192, 193 rotate in rotation direction R20 together. As the landing gear 100 is extended, the truck support strut brace 160 rotates, via the driving link 195, the outer torsion bar 192 in direction D21 which causes rotation of the inner torsion bar 193 (via the spline connection) (FIG. 20, Block 2300). The outer torsion bar 192 is constrained to rotate with the truck support strut brace 160 (by driving link 195) and the inner torsion bar 193 is constrained to rotate with the at least one locking member 125A. (by the coupling between the second end 193E2 of the inner torsion bar 193 and the at least one locking member 125A. A driving torque of the outer torsion bar 192 (which is rotated by the truck support strut brace 160) and a lagging rotation of the at least one locking member 125A create a biasing rotation of the at least one locking member 125A about torsion bar pivot axis 191PA (FIG. 20, Block 2301). For example, the outer torsion bar 192 rotates at a faster rate than the inner torsion bar 193 and produces a stored biasing torque within the inner torsion bar 193 (e.g., due to the differential rotation of the outer torsion bar 192 and the second end 193E2 of the inner torsion bar 193 coupled to the at least one locking member 125A) which biases rotation of at least one locking member 125A and causes extension and locking of the at least one locking member 125A. The inner torsion bar 193 may be preloaded in torque or a cam lever on the outer torsion bar 192 may over rotate the outer torsion bar 192 relative to the rotation travel of the at least one locking member 125A.

Referring now to FIGS. 1, 2, 3A-3D, 17A-17D, 18A-18D, and 19, a method 2000 for operating, for example, landing gear 100 is illustrated. It is noted that landing gear 100' operates in substantially the same manner described herein. In one aspect, the landing gear 100 is situated in an extended/unfolded position disposed at least partially beyond the lateral width 1001LW of the fuselage 1001 such as during ground operations, takeoff, and landing of the aircraft 1000. While the landing gear 100 is in an extended position, the landing gear retract mechanism 120 is also in an extended position as illustrated in, e.g., FIGS. 3A, 17A, 18A.

In order to retract the landing gear 100, for example, after takeoff, in one aspect, the landing gear retract mechanism 120 is operated so that the carrier member 140 is driven along the longitudinal axis 110LA of the truck support strut 110 to fold the at least one wheel support arm 130A, 130B (FIG. 19, Block 2002). For example, the first link member 122A, 122B is rotatably fixed to the frame 1000F of the aircraft 1000 about pivot axis 122PA, 122PB. Force F is applied, by the at least one actuator 180A, 180B, to the first link member 122A, 122B. Due to the first link member 122A, 122B being rotatably fixed to the frame 1000F of the aircraft 1000, the stabilizing link pivot axis 121PA, 121PB is forced about the pivot axis 122PA, 122PB in direction R16 and the second link member 123A, 123B is rotated relative to the first link member 122A, 122B in direction R6. The stabilizing link pivot axis 121PA, 121PB pivoting about pivot axis 122PA, 122PB causes an unlocking of the over center locked position of the at least one locking member 125A, 125B (FIG. 19, Block 2001). The second link member 123A, 123B being rotatably fixed to the truck support strut 110 and rotating relative to the first link member 122A, 122B in direction R6 forces the truck support strut 110 to rotate about the trunnion axis 1000TA in direction R1B (FIG. 4) into the fuselage 1001 (FIG. 19, Block 2003). As the truck support strut 110 and the truck support strut brace 160 are rotated, the over center locked position of the carrier drive linkage 170 is unlocked (i.e., the carrier crank link 172 folds relative to the connecting link 174) to effect moving of the carrier member 140 and pivoting/folding of the at least one wheel support arm 130A, 130B (FIG. 19, Block 2004). The carrier crank link 172 and connecting link 174 folding relative to each other drives the carrier member 140 along the longitudinal axis 110LA from the second end 110E2 to the first end 110E1 of the truck support strut 110 (FIG. 19, Block 2005).

As the landing gear 100 retracts/folds to the retracted position (shown in FIG. 3D), the carrier member 140 transiting from the second end 110E2 to the first end 110E1 of the truck support strut 110 carries the at least one shock absorber 150A, 150B towards the first end 110E1 of the truck support strut 110 to effect rotation of at least one wheel support arm 130A, 130B relative to the truck support strut 110. The at least one wheel support arm 130A, 130B rotates about the truck pivot axis 130PA in direction 999R toward the first end 110E1 of the truck support strut 110 (FIG. 19, Block 2006) to shrink the landing gear 100.

Referring now to FIGS. 1, 2, 3A-3D, 17A-17D, 18A-18D, and 20, a method 2100 for extending, for example, landing gear 100 is illustrated. As noted above, the landing gear 100' operates in substantially the same manner described herein. In one aspect, the landing gear 100 is situated in a retracted/folded position disposed within the fuselage 1001 of the aircraft 1000. While the landing gear 100 is in the retracted position, the landing gear retract mechanism 120 is also in a retracted position as illustrated in, e.g., FIGS. 3D, 17D, 18D.

In order to extend the landing gear 100, for example, before landing, a sequence opposite that illustrated in FIGS. 3A-3D, 17A-17D, 18A-18D is initiated by, e.g., deploying the landing gear 100 under gravitational forces (FIG. 20, Block 2101). As the truck support strut 110 and the truck support strut brace 160 rotate about the trunnion axis 1000TA and travel to an extended position under gravitational forces, the landing gear retract mechanism 120 is extended (FIG. 20, Block 2102). For example, the carrier crank link 172 of the carrier drive linkage 170 is rotated relative to both the carrier member 140 and the connecting link 174 (FIG. 20, Block 2103). The carrier crank link 172 rotates about the carrier crank link second axis of rotation 172AR2 relative to the connecting link 174 and about the carrier crank link first axis of rotation 172AR1 relative to the carrier member 140 toward an over center locked position. This drives the carrier member 140 along the longitudinal axis 110LA toward the second end 110E2 of the truck support strut 110 to unfold the at least one wheel support arm 130A, 130B (FIG. 20, Block 2104). Once in the over center locked position, the at least one wheel support arm 130A, 130B pivots only due to reciprocation of the at least shock absorber 150A, 150B.

The at least one stabilizing link 121A, 121B and at least one locking member 125A, 125B unfold to lock the truck support strut 110 and the truck support strut brace 160 into the extended position with another over center locked position (FIG. 20, Block 2105).

In one aspect, the landing gear 100 is biased towards the extended configuration with the at least one torsion bar 191 coupling the landing gear retract mechanism 120 to the frame 1000F.

Examples of the present disclosure may be described in the context of aircraft manufacturing and service method 2200 as shown in FIG. 22. In other aspects, the examples of the present disclosure may be applied in any suitable industry, such as e.g. automotive, maritime and aerospace. With respect to aircraft manufacturing, during pre-production, illustrative method 2200 may include specification and design (FIG. 22, Block 2204) of aircraft 1000 and material procurement (FIG. 22, Block 2206). During production, component and subassembly manufacturing (FIG. 22, Block 2208) and system integration (FIG. 22, Block 2210) of aircraft 1000 may take place, which may include manufacturing and installation of the landing gear 100. Thereafter, aircraft 1000 may go through certification and delivery (FIG. 22, Block 2212) to be placed in service (FIG. 22, Block 2214). While in service, aircraft 1000 may be scheduled for routine maintenance and service (FIG. 22, Block 2216). Routine maintenance and service may include modification, reconfiguration, refurbishment, etc. of one or more systems of aircraft 1000, which may include installation of the landing gear 100 as described herein.

Each of the processes of illustrative method 2200 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of the manufacturing and service method 2200. For example, components or subassemblies corresponding to component and subassembly manufacturing (FIG. 22, Block 2208) may be fabricated or manufactured in a manner similar to components or subassemblies produced while aircraft 1000 is in service (FIG. 22, Block 2214). Also, one or more examples of the apparatus(es), method(s), or combination thereof may be utilized during production of the aircraft 1000, for example, by substantially expediting assembly of or reducing the cost of aircraft 1000. Similarly, one or more examples of the apparatus or method realizations, or a combination thereof, may be utilized, for example and without limitation, while aircraft 1000 is in service (FIG. 22, Block 2214) and/or during maintenance and service (FIG. 22, Block 2216).

The following clauses (A1-C5) are provided in accordance with the aspects of the present disclosure:

A1. A landing gear for an aircraft, the landing gear comprising:
 a truck support strut having a first end and a second end separated by a longitudinal axis;
 a landing gear retract mechanism coupling the truck support strut to a frame of the aircraft, so that the first end of the truck support strut is suspended from the frame by the landing gear retract mechanism;
 at least one wheel support arm rotatably coupled to the second end of the truck support strut, the at least one wheel support arm having at least one wheel pivot axis;
 a carrier member coupled to the landing gear retract mechanism and to the truck support strut so that the landing gear retract mechanism drives the carrier member along the longitudinal axis of the truck support strut; and
 at least one shock absorber, each of the at least one shock absorber being coupled to both a respective one of the at least one wheel support arm and the carrier member so that movement of the carrier member along the longitudinal axis by the landing gear retract mechanism effects rotation of the at least one wheel support arm relative to the truck support strut so that the at least one wheel support arm rotates towards or away from the first end of the truck support strut.

A2. The landing gear of clause A1, further comprising a truck support strut brace rotatably coupled to the frame about a trunnion axis, the truck support strut brace couples the second end of the truck support strut to the frame.

A3. The landing gear of clause A2, wherein the truck support strut brace is non-rotatably coupled to the truck support strut.

A4. The landing gear of clause A2, wherein the landing gear retract mechanism comprises:
 at least one stabilizing link that couples the truck support strut to the frame; and
 at least one locking member that couples a respective stabilizing link to the frame.

A5. The landing gear of clause A4, wherein the at least one stabilizing link is an articulated link.

A6. The landing gear of clause A4, wherein the at least one stabilizing link comprises a first link member and a second link member, the first link member being rotatably coupled to the second link member at a stabilizing link pivot axis.

A7. The landing gear of clause A6, wherein the at least one locking member is coupled to one of the first link member and the second link member proximate the stabilizing link pivot axis.

A8. The landing gear of clause A4, wherein the at least one locking member is articulated and includes a first locking link and a second locking link that is rotatably coupled to the first locking link.

A9. The landing gear of clause A4, wherein the landing gear retract mechanism further comprises a carrier drive linkage coupled to the carrier member, the carrier drive linkage being configured to move the carrier member along the longitudinal axis of the truck support strut.

A10. The landing gear of clause A9, wherein the carrier drive linkage comprises:
 a lateral stabilizing link coupled to both the truck support strut brace, adjacent the trunnion axis, and the first end of the truck support strut;
 a carrier crank link having a carrier crank link first end and a carrier crank link second end, the carrier crank link first end being rotatably coupled to the carrier member at a carrier crank link first axis of rotation;
 a pivot link that couples the carrier crank link second end to the frame; and
 a connecting link that couples the lateral stabilizing link to the carrier crank link, where the connecting link is rotatably coupled to the carrier crank link at a carrier crank link second axis of rotation, the carrier crank link first axis of rotation being distinct from and disposed adjacent to the carrier crank link second axis of rotation at the carrier crank link first end.

A11. The landing gear of clause A10, wherein the truck support strut brace includes a crank arm that rotates about the trunnion axis and the lateral stabilizing link is rotatably coupled to the crank arm.

A12. The landing gear of clause A10, further comprising at least one actuator that couples the at least one stabilizing link to the frame, the at least one actuator being configured to drive movement of the at least one stabilizing link to at least retract the landing gear and effect actuation of the landing gear retract mechanism so that the at least one wheel support arm rotates towards or away from the first end of the truck support strut.

A13. The landing gear of clause A9, wherein the carrier drive linkage comprises:
 an articulated lateral stabilizing link coupled to both the truck support strut brace, adjacent the trunnion axis, and the first end of the truck support strut;
 a carrier crank link having a carrier crank link first end and a carrier crank link second end, the carrier crank link first end being rotatably coupled to the carrier member at a carrier crank link first axis of rotation and to the articulated lateral stabilizing link at a carrier crank link second axis of rotation, the carrier crank link first axis of rotation being distinct from and disposed adjacent to the carrier crank link second axis of rotation at the carrier crank link first end; and
 a pivot link that couples the carrier crank link second end to the frame.

A14. The landing gear of clause A13, wherein:
 the truck support strut brace includes a crank arm that rotates about the trunnion axis; and
 at least one actuator couples the crank arm to the frame, the at least one actuator being configured to drive movement of the truck support strut brace to at least retract the landing gear and effect actuation of the landing gear retract mechanism so that the at least one wheel support arm rotates towards or away from the first end of the truck support strut.

A15. The landing gear of clause A13, wherein the articulated lateral stabilizing link comprises:
 a first lateral stabilizing link member having a first end and a second end, the first end being rotatably coupled to the truck support strut brace;
 a second lateral stabilizing link member having a third end rotatably coupled to the second end of the first lateral stabilizing link and a fourth end, the fourth end having a strut pivot axis and a crank pivot axis disposed adjacent one another where the second lateral stabilizing link member is rotatably coupled to the truck support strut at the strut pivot axis and rotatably coupled to the carrier crank link at the crank pivot axis.

A16. The landing gear of clause A4, further comprising an over center actuation mechanism coupled to the at least one locking member, the over center actuation mechanism being configured to lock the at least one locking member in an over center configuration.

A17. The landing gear of clause A16, wherein the over center actuation mechanism comprises at least one torsion bar coupling the frame and at least one locking member.

A18. The landing gear of clause A17, wherein the at least one torsion bar comprises:
an outer torsion bar rotatably coupled to the frame about a torsion bar pivot axis, the outer torsion bar being coupled to the truck support strut brace so that rotation of the truck support strut brace about the trunnion axis causes rotation of the outer torsion bar; and
an inner torsion bar disposed at least partially within the outer torsion bar and coupled to the outer torsion bar so that at least a portion of the inner torsion bar rotates as a unit with the outer torsion bar, the inner torsion bar being coupled to the at least one locking member so that torque applied to the inner torsion bar by the outer torsion bar is transferred to the at least one locking member through the inner torsion bar.

A19. The landing gear of clause A18, wherein the inner torsion bar is non-rotatably coupled to the outer torsion bar by a spline coupling.

A20. The landing gear of clause A17, wherein the torsion bar is configured so as to lock the at least one locking member in an over center configuration upon passive gravitational extension of the landing gear.

A21. The landing gear of clause A1, wherein the at least one wheel support arm comprises at least one of a leading wheel support arm and a trailing wheel support arm, each of the leading wheel support arm and the trailing wheel support arm having a first end and a second end spaced from one another, wherein
the first end of a respective one of the leading wheel support arm and the trailing wheel support arm is rotatably coupled to the second end of the truck support strut, and
the at least one wheel pivot axis is disposed at the second end of each respective one of the leading wheel support arm and the trailing wheel support arm.

A22. The landing gear of clause A1, wherein:
the at least one shock absorber comprises an outer cylinder and an inner cylinder that reciprocates within the outer cylinder; and
the inner cylinder and outer cylinder remain static relative to each other during movement of the carrier member along the longitudinal axis of the truck support strut.

A23. The landing gear of clause A1, wherein the at least one shock absorber and the at least one wheel support arm are configured so as to increase a length of the landing gear about 21 inches from a 1G loaded configuration.

A24. The landing gear of clause A1, wherein the landing gear retract mechanism is configured to shrink a length of the landing gear from an extended position by about 52 inches.

B1. An aircraft comprising:
a frame forming a fuselage that has a longitudinal length and a lateral width;
wings coupled to the frame; and
a landing gear coupled to the frame for stowage within the fuselage, the landing gear including
a truck support strut having a first end and a second end separated by a longitudinal axis,
a landing gear retract mechanism coupling the truck support strut to a frame of the aircraft, so that the first end of the truck support strut is suspended from the frame by the landing gear retract mechanism,
at least one wheel support arm rotatably coupled to the second end of the truck support strut, the at least one wheel support arm having at least one wheel pivot axis,
a carrier member coupled to the landing gear retract mechanism and to the truck support strut so that the landing gear retract mechanism drives the carrier member along the longitudinal axis of the truck support strut, and
at least one shock absorber, each of the at least one shock absorber being coupled to both a respective one of the at least one wheel support arm and the carrier member so that movement of the carrier member along the longitudinal axis by the landing gear retract mechanism effects rotation of the at least one wheel support arm relative to the truck support strut so that the at least one wheel support arm rotates towards or away from the first end of the truck support strut.

B2. The aircraft of clause B1, wherein:
the wings comprise respective wing roots, each wing being coupled to the fuselage at the respective wing root; and
the landing gear is coupled to the frame aft of the wings so as to be stowed within a portion of the fuselage that is separate and distinct from the wing root.

B3. The aircraft of clause B1, wherein the landing gear is longitudinally spaced apart from the wings and, when extended, the truck support strut is disposed entirely beyond the lateral width of the fuselage.

B4. The aircraft of clause B1, wherein the landing gear is coupled to the frame independent of any structure of the wings.

B5. The aircraft of clause B1, wherein the landing gear is coupled to the frame independent of any structure that couples the wings to the frame.

B6. The aircraft of clause B1, further comprising a truck support strut brace rotatably coupled to the frame about a trunnion axis, the truck support strut brace couples the second end of the truck support strut to the frame.

B7. The aircraft of clause B6, wherein the truck support strut brace is non-rotatably coupled to the truck support strut.

B8. The aircraft of clause B6, wherein the landing gear retract mechanism comprises:
at least one stabilizing link that couples the truck support strut to the frame; and
at least one locking member that couples a respective stabilizing link to the frame.

B9. The aircraft of clause B8, wherein the at least one stabilizing link is an articulated link.

B10. The aircraft of clause B8, wherein the at least one stabilizing link comprises a first link member and a second link member, the first link member being rotatably coupled to the second link member at a stabilizing link pivot axis.

B11. The aircraft of clause B10, wherein the at least one locking member is coupled to one of the first link member and the second link member proximate the stabilizing link pivot axis.

B12. The aircraft of clause B8, wherein the at least one locking member is articulated and includes a first locking link and a second locking link that is rotatably coupled to the first locking link.

B13. The aircraft of clause B8, wherein the landing gear retract mechanism further comprises a carrier drive linkage coupled to the carrier member, the carrier drive linkage being configured to move the carrier member along the longitudinal axis of the truck support strut.

B14. The aircraft of clause B13, wherein the carrier drive linkage comprises:
 a lateral stabilizing link coupled to both the truck support strut brace, adjacent the trunnion axis, and the first end of the truck support strut;
 a carrier crank link having a carrier crank link first end and a carrier crank link second end, the carrier crank link first end being rotatably coupled to the carrier member at a carrier crank link first axis of rotation;
 a pivot link that couples the carrier crank link second end to the frame; and
 a connecting link that couples the lateral stabilizing link to the carrier crank link, where the connecting link is rotatably coupled to the carrier crank link at a carrier crank link second axis of rotation, the carrier crank link first axis of rotation being distinct from and disposed adjacent to the carrier crank link second axis of rotation at the carrier crank link first end.

B15. The aircraft of clause B14, wherein the truck support strut brace includes a crank arm that rotates about the trunnion axis and the lateral stabilizing link is rotatably coupled to the crank arm.

B16. The aircraft of clause B14, further comprising at least one actuator that couples the at least one stabilizing link to the frame, the at least one actuator being configured to drive movement of the at least one stabilizing link to at least retract the landing gear and effect actuation of the landing gear retract mechanism so that the at least one wheel support arm rotates towards or away from the first end of the truck support strut.

B17. The aircraft of clause B13, wherein the carrier drive linkage comprises:
 an articulated lateral stabilizing link coupled to both the truck support strut brace, adjacent the trunnion axis, and the first end of the truck support strut;
 a carrier crank link having a carrier crank link first end and a carrier crank link second end, the carrier crank link first end being rotatably coupled to the carrier member at a carrier crank link first axis of rotation and to the articulated lateral stabilizing link at a carrier crank link second axis of rotation, the carrier crank link first axis of rotation being distinct from and disposed adjacent to the carrier crank link second axis of rotation at the carrier crank link first end; and
 a pivot link that couples the carrier crank link second end to the frame.

B18. The aircraft of clause B17, wherein:
 the truck support strut brace includes a crank arm that rotates about the trunnion axis; and
 at least one actuator couples the crank arm to the frame, the at least one actuator being configured to drive movement of the truck support strut brace to at least retract the landing gear and effect actuation of the landing gear retract mechanism so that the at least one wheel support arm rotates towards or away from the first end of the truck support strut.

B19. The aircraft of clause B17, wherein the articulated lateral stabilizing link comprises:
 a first lateral stabilizing link member having a first end and a second end, the first end being rotatably coupled to the truck support strut brace;
 a second lateral stabilizing link member having a third end rotatably coupled to the second end of the first lateral stabilizing link and a fourth end, the fourth end having a strut pivot axis and a crank pivot axis disposed adjacent one another where the second lateral stabilizing link member is rotatably coupled to the truck support strut at the strut pivot axis and rotatably coupled to the carrier crank link at the crank pivot axis.

B20. The aircraft of clause B8, further comprising an over center actuation mechanism coupled to the at least one locking member, the over center actuation mechanism being configured to lock the at least one locking member in an over center configuration.

B21. The aircraft of clause B20, wherein the over center actuation mechanism comprises at least one torsion bar coupling the frame and at least one locking member.

B22. The aircraft of clause B21, wherein the at least one torsion bar comprises:
 an outer torsion bar rotatably coupled to the frame about a torsion bar pivot axis, the outer torsion bar being coupled to the truck support strut brace so that rotation of the truck support strut brace about the trunnion axis causes rotation of the outer torsion bar; and
 an inner torsion bar disposed at least partially within the outer torsion bar and coupled to the outer torsion bar so that at least a portion of the inner torsion bar rotates as a unit with the outer torsion bar, the inner torsion bar being coupled to the at least one locking member so that torque applied to the inner torsion bar by the outer torsion bar is transferred to the at least one locking member through the inner torsion bar.

B23. The aircraft of clause B22, wherein the inner torsion bar is non-rotatably coupled to the outer torsion bar by a spline coupling.

B24. The aircraft of clause B21, wherein the torsion bar is configured so as to lock the at least one locking member in an over center configuration upon passive gravitational extension of the landing gear.

B25. The aircraft of clause B1, wherein the at least one wheel support arm comprises at least one of a leading wheel support arm and a trailing wheel support arm, each of the leading wheel support arm and the trailing wheel support arm having a first end and a second end spaced from one another, wherein
 the first end of a respective one of the leading wheel support arm and the trailing wheel support arm is rotatably coupled to the second end of the truck support strut, and
 the at least one wheel pivot axis is disposed at the second end of each respective one of the leading wheel support arm and the trailing wheel support arm.

B26. The aircraft of clause B1, wherein:
 the at least one shock absorber comprises an outer cylinder and an inner cylinder that reciprocates within the outer cylinder; and
 the inner cylinder and outer cylinder remain static relative to each other during movement of the carrier member along the longitudinal axis of the truck support strut.

B27. The aircraft of clause B1, wherein the at least one shock absorber and the at least one wheel support arm are configured so as to increase a length of the landing gear about 21 inches from a 1G loaded configuration.

B28. The aircraft of clause B1, wherein the landing gear retract mechanism is configured to shrink a length of the landing gear from an extended position by about 52 inches.

C1. A method for operating a landing gear of an aircraft, the method comprising:
 operating a landing gear retract mechanism so that a carrier member, coupled to the landing gear retract mechanism and to a truck support strut, is driven along a longitudinal axis of the truck support strut, where the truck support strut has a first end and a second end separated by the longitudinal axis and the landing gear retract mechanism couples the truck support strut to a frame of the aircraft, so that the first end of the truck support is suspended from the frame by the landing gear retract mechanism; and moving, with the carrier member, at least one shock absorber so that movement of the carrier member along the longitudinal axis by the actuation mechanism effects rotation of at least one wheel support arm relative to the truck support strut so that the at least one wheel support arm rotates towards or away from the first end of the truck support strut, where each of the at least one shock absorber is coupled to both the at least one wheel support arm and the carrier member and the at least one wheel support arm is rotatably coupled to the second end of the truck support strut.

C2. The method of clause C1, wherein the landing gear is retracted into a portion of the fuselage that is longitudinally spaced along the fuselage that is separate and distinct from a structure of wings of the aircraft.

C3. The method of clause C1, wherein the landing gear is retracted into the fuselage at a portion of the fuselage that is aft of wings of the aircraft.

C4. The method of clause C1, wherein the movement of the carrier member along the longitudinal axis of the truck support strut causes the at least one shock absorber to pull on the at least one wheel support arm for rotating the at least one wheel support arm towards the first end of the truck support strut.

C5. The method of clause C1, further comprising biasing the landing gear towards an extended configuration with at least one torsion bar coupling the landing gear retract mechanism to the frame.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 19-21, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 19-21 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present

What is claimed is:

1. A landing gear for an aircraft, the landing gear comprising:
    a truck support strut having a first end and a second end separated by a longitudinal axis;
    a landing gear retract mechanism coupling the truck support strut to a frame of the aircraft, so that the first end of the truck support strut is suspended from the frame by the landing gear retract mechanism;
    at least one wheel support arm rotatably coupled to the second end of the truck support strut, the at least one wheel support arm having at least one wheel pivot axis;
    a carrier member coupled to the landing gear retract mechanism and to the truck support strut so that the landing gear retract mechanism drives the carrier member along the longitudinal axis of the truck support strut; and
    at least one shock absorber, each of the at least one shock absorber being coupled to both a respective one of the at least one wheel support arm and the carrier member so that movement of the carrier member along the longitudinal axis by the landing gear retract mechanism effects rotation of the at least one wheel support arm relative to the truck support strut so that the at least one wheel support arm rotates towards or away from the first end of the truck support strut.

2. The landing gear of claim 1, further comprising a truck support strut brace rotatably coupled to the frame about a trunnion axis, the truck support strut brace couples the second end of the truck support strut to the frame.

3. The landing gear of claim 2, wherein the landing gear retract mechanism comprises:
    at least one stabilizing link that couples the truck support strut to the frame; and
    at least one locking member that couples a respective stabilizing link to the frame.

4. The landing gear of claim 3, wherein the at least one stabilizing link is an articulated link.

5. The landing gear of claim 3, wherein the at least one locking member is articulated and includes a first locking link and a second locking link that is rotatably coupled to the first locking link.

6. The landing gear of claim 3, wherein the landing gear retract mechanism further comprises a carrier drive linkage coupled to the carrier member, the carrier drive linkage being configured to move the carrier member along the longitudinal axis of the truck support strut.

7. The landing gear of claim 6, wherein the carrier drive linkage comprises:
    a lateral stabilizing link coupled to both the truck support strut brace, adjacent the trunnion axis, and the first end of the truck support strut;
    a carrier crank link having a carrier crank link first end and a carrier crank link second end, the carrier crank link first end being rotatably coupled to the carrier member at a carrier crank link first axis of rotation;
    a pivot link that couples the carrier crank link second end to the frame; and
    a connecting link that couples the lateral stabilizing link to the carrier crank link, where the connecting link is rotatably coupled to the carrier crank link at a carrier crank link second axis of rotation, the carrier crank link first axis of rotation being distinct from and disposed adjacent to the carrier crank link second axis of rotation at the carrier crank link first end.

8. The landing gear of claim 7, further comprising at least one actuator that couples the at least one stabilizing link to the frame, the at least one actuator being configured to drive movement of the at least one stabilizing link to at least retract the landing gear and effect actuation of the landing gear retract mechanism so that the at least one wheel support arm rotates towards or away from the first end of the truck support strut.

9. The landing gear of claim 6, wherein the carrier drive linkage comprises:
    an articulated lateral stabilizing link coupled to both the truck support strut brace, adjacent the trunnion axis, and the first end of the truck support strut;
    a carrier crank link having a carrier crank link first end and a carrier crank link second end, the carrier crank link first end being rotatably coupled to the carrier member at a carrier crank link first axis of rotation and to the articulated lateral stabilizing link at a carrier crank link second axis of rotation, the carrier crank link first axis of rotation being distinct from and disposed adjacent to the carrier crank link second axis of rotation at the carrier crank link first end; and
    a pivot link that couples the carrier crank link second end to the frame.

10. The landing gear of claim 3, further comprising an over center actuation mechanism coupled to the at least one locking member, the over center actuation mechanism being configured to lock the at least one locking member in an over center configuration.

11. The landing gear of claim 10, wherein the over center actuation mechanism comprises at least one torsion bar coupling the frame and at least one locking member.

12. An aircraft comprising:
    a frame forming a fuselage that has a longitudinal length and a lateral width;
    wings coupled to the frame; and
    a landing gear coupled to the frame for stowage within the fuselage, the landing gear including a truck support strut having a first end and a second end separated by a longitudinal axis,
    a landing gear retract mechanism coupling the truck support strut to the frame, so that the first end of the truck support strut is suspended from the frame by the landing gear retract mechanism,
    at least one wheel support arm rotatably coupled to the second end of the truck support strut, the at least one wheel support arm having at least one wheel pivot axis,
    a carrier member coupled to the landing gear retract mechanism and to the truck support strut so that the landing gear retract mechanism drives the carrier member along the longitudinal axis of the truck support strut, and at least one shock absorber, each of the at least one shock absorber being coupled to both a respective one of the at least one wheel support arm and the carrier member so that movement of the carrier member along the longitudinal axis by the landing gear retract mechanism effects rotation of the at least one wheel support arm relative to the truck support strut so that the at least one wheel support arm rotates towards or away from the first end of the truck support strut.

13. The aircraft of claim 12, wherein:

the wings comprise respective wing roots, each wing being coupled to the fuselage at the respective wing root; and the landing gear is coupled to the frame aft of the wings so as to be stowed within a portion of the fuselage that is separate and distinct from the wing root.

14. The aircraft of claim 12, wherein the landing gear is longitudinally spaced apart from the wings and, when extended, the truck support strut is disposed entirely beyond the lateral width of the fuselage.

15. The aircraft of claim 12, wherein the at least one wheel support arm comprises at least one of a leading wheel support arm and a trailing wheel support arm, each of the leading wheel support arm and the trailing wheel support arm having a first end and a second end spaced from one another, wherein the first end of a respective one of the leading wheel support arm and the trailing wheel support arm is rotatably coupled to the second end of the truck support strut, and the at least one wheel pivot axis is disposed at the second end of each respective one of the leading wheel support arm and the trailing wheel support arm.

16. A method for operating a landing gear of an aircraft, where the aircraft includes a fuselage, the method comprising:

operating a landing gear retract mechanism so that a carrier member, coupled to the landing gear retract mechanism and to a truck support strut, is driven along a longitudinal axis of the truck support strut, where the truck support strut has a first end and a second end separated by the longitudinal axis and the landing gear retract mechanism couples the truck support strut to a frame of the aircraft, so that the first end of the truck support strut is suspended from the frame by the landing gear retract mechanism; and moving, with the carrier member, at least one shock absorber so that movement of the carrier member along the longitudinal axis by the landing gear retract mechanism effects rotation of at least one wheel support arm relative to the truck support strut so that the at least one wheel support arm rotates towards or away from the first end of the truck support strut, where each of the at least one shock absorber is coupled to both the at least one wheel support arm and the carrier member and the at least one wheel support arm is rotatably coupled to the second end of the truck support strut.

17. The method of claim 16, wherein the landing gear is retracted into a portion of the fuselage that is longitudinally spaced along the fuselage separate and distinct from a structure of wings of the aircraft.

18. The method of claim 16, wherein the landing gear is retracted into the fuselage at a portion of the fuselage that is aft of wings of the aircraft.

19. The method of claim 16, wherein the movement of the carrier member along the longitudinal axis of the truck support strut causes the at least one shock absorber to pull on the at least one wheel support arm for rotating the at least one wheel support arm towards the first end of the truck support strut.

20. The method of claim 16, further comprising biasing the landing gear towards an extended configuration with at least one torsion bar coupling the landing gear retract mechanism to the frame.

\* \* \* \* \*